US011929622B2

(12) United States Patent
Walsh

(10) Patent No.: US 11,929,622 B2
(45) Date of Patent: *Mar. 12, 2024

(54) OPTIMIZATION AND MANAGEMENT OF RENEWABLE ENERGY SOURCE BASED POWER SUPPLY FOR EXECUTION OF HIGH COMPUTATIONAL WORKLOADS

(71) Applicant: Sean Walsh, San Juan, PR (US)

(72) Inventor: Sean Walsh, San Juan, PR (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/676,257

(22) Filed: Feb. 21, 2022

(65) Prior Publication Data

US 2022/0173598 A1 Jun. 2, 2022

Related U.S. Application Data

(63) Continuation-in-part of application No. 17/671,579, filed on Feb. 14, 2022, and a continuation-in-part of
(Continued)

(51) Int. Cl.
G05B 19/042 (2006.01)
H02J 3/28 (2006.01)
H02J 3/38 (2006.01)

(52) U.S. Cl.
CPC ............ *H02J 3/381* (2013.01); *G05B 19/042* (2013.01); *H02J 3/28* (2013.01); *G05B 2219/2639* (2013.01); *H02J 2300/24* (2020.01)

(58) Field of Classification Search
CPC .......... H02J 3/381; H02J 3/28; H02J 2300/24; H02J 2300/20; H02J 7/35; G05B 19/042;
(Continued)

(56) References Cited

U.S. PATENT DOCUMENTS 4,803,632 A * 2/1989 Frew .................... G01R 22/065
340/12.32
5,659,465 A 8/1997 Flack et al.
(Continued)

FOREIGN PATENT DOCUMENTS

AU 2021106837 A4 11/2021
CN 206790124 U 12/2017
(Continued)

OTHER PUBLICATIONS

Goiri, W. Katsak, K. Le, T. D. Nguyen and R. Bianchini, "Designing and Managing Data centers Powered by Renewable Energy," in IEEE Micro, vol. 34, No. 3, pp. 8-16, May-Jun. 2014, doi: 10.1109/MM.2014.6. (Year: 2014).*

(Continued)

Primary Examiner — Alicia M. Choi
(74) Attorney, Agent, or Firm — LEGALFORCE RAPC WORLDWIDE

(57) ABSTRACT

A method includes selectably controlling a power supply from a renewable energy source based power system and an energy storage device charged thereby and/or an Alternating Current (AC) power system to a computing system including one or more data processing device(s) and a set of loads using an electronic control system, and continuously updating, through a computing power management system associated with the electronic control system, a parameter of operation of the one or more data processing device(s) and/or the set of loads in response to analyzing data pertinent to prior energy usage/production and/or predicted energy usage/production relevant to execution of a high computational workload through the one or more data processing device(s). The method also includes optimizing the power supply from the renewable energy source based power system and/or the energy storage device to the one or more (Continued)

data processing device(s) based on the continuously updated parameter of operation.

20 Claims, 14 Drawing Sheets

Related U.S. Application Data application No. 17/590,826, filed on Feb. 2, 2022, said application No. 17/671,579 is a continuation-in-part of application No. 17/590,826, filed on Feb. 2, 2022, which is a continuation-in-part of application No. 17/579,628, filed on Jan. 20, 2022, said application No. 17/671,579 is a continuation-in-part of application No. 17/579,628, filed on Jan. 20, 2022, application No. 17/676,257 is a continuation-in-part of application No. 17/579,628, filed on Jan. 20, 2022, which is a continuation-in-part of application No. 17/574,592, filed on Jan. 13, 2022, said application No. 17/671,579 is a continuation-in-part of application No. 17/574,592, filed on Jan. 13, 2022, said application No. 17/590,826 is a continuation-in-part of application No. 17/574,592, filed on Jan. 13, 2022, application No. 17/676,257 is a continuation-in-part of application No. 17/574,592, filed on Jan. 13, 2022, said application No. 17/590,826 is a continuation-in-part of application No. 17/005,318, filed on Aug. 28, 2020, now Pat. No. 11,289,914, said application No. 17/574,592 is a continuation of application No. 17/005,318, filed on Aug. 28, 2020, now Pat. No. 11,289,914, said application No. 17/579,628 is a continuation-in-part of application No. 17/005,318, filed on Aug. 28, 2020, now Pat. No. 11,289,914, application No. 17/676,257 is a continuation-in-part of application No. 17/005,318, filed on Aug. 28, 2020, now Pat. No. 11,289,914, said application No. 17/671,579 is a continuation-in-part of application No. 17/005,318, filed on Aug. 28, 2020, now Pat. No. 11,289,914, which is a continuation-in-part of application No. 16/115,623, filed on Aug. 29, 2018, now Pat. No. 10,795,428.

(58) Field of Classification Search
CPC ... G05B 2219/2639; G06F 1/26; G06F 1/263; G06F 1/28; G06F 1/324; G06F 1/3203; G06Q 2220/00; G06Q 20/065; G06Q 20/0855; G06Q 20/127; G06Q 20/145; G06Q 20/29; G06Q 10/04; G06Q 50/06; H04L 2209/56; H04L 9/3239; H04L 9/50; Y02E 10/56; Y02P 80/10; Y04S 40/20; Y04S 50/12; G07F 15/003; G05F 1/66
See application file for complete search history.

(56) References Cited

U.S. PATENT DOCUMENTS

| | | | |
|---|---|---|---|
| 8,560,677 B2 | 10/2013 | VanGilder et al. | |
| 8,624,433 B2 | 1/2014 | Whitted et al. | |
| 8,849,469 B2 | 9/2014 | Belady et al. | |
| 8,856,576 B2 | 10/2014 | Stanley-Marbell | |
| 9,231,435 B2 | 1/2016 | Sander et al. | |
| 9,430,021 B2 | 8/2016 | Lu et al. | |
| 9,490,635 B2 | 11/2016 | Lee et al. | |
| 9,632,553 B2 | 4/2017 | Kumar Pannem et al. | |
| 9,929,567 B2 | 3/2018 | Wang et al. | |
| 9,960,637 B2 | 5/2018 | Sanders et al. | |
| 10,250,040 B2 | 4/2019 | Narita | |
| 10,270,266 B2 | 4/2019 | Beaston | |
| 10,367,353 B1 | 7/2019 | McNamara et al. | |
| 10,608,433 B1 | 3/2020 | McNamara et al. | |
| 10,719,773 B2 | 7/2020 | Harper, III et al. | |
| 11,016,456 B2 | 5/2021 | Henson et al. | |
| 11,016,553 B2 | 5/2021 | McNamara et al. | |
| 11,025,060 B2 | 6/2021 | McNamara et al. | |
| 11,031,787 B2 | 6/2021 | McNamara et al. | |
| 11,031,813 B2 | 6/2021 | McNamara et al. | |
| 11,042,948 B1 | 6/2021 | McNamara et al. | |
| 11,126,242 B2 | 9/2021 | Shaikh et al. | |
| 11,128,165 B2 | 9/2021 | McNamara et al. | |
| 11,159,015 B2 | 10/2021 | Valkov | |
| 11,188,131 B2 | 11/2021 | Chang et al. | |
| 11,196,291 B2 | 12/2021 | Rixhon et al. | |
| 2007/0220289 A1* | 9/2007 | Holle | G06F 1/3203 713/300 |
| 2009/0050192 A1 | 2/2009 | Tanaka et al. | |
| 2010/0010688 A1* | 1/2010 | Hunter | G06F 1/206 713/340 |
| 2011/0006607 A1 | 1/2011 | Kwon et al. | |
| 2011/0022857 A1* | 1/2011 | Nussbaum | G06F 1/3296 713/300 |
| 2012/0056481 A1 | 3/2012 | Corhodzic et al. | |
| 2012/0299383 A1 | 11/2012 | Cyuzawa et al. | |
| 2013/0207465 A1 | 8/2013 | Sun | |
| 2013/0212410 A1* | 8/2013 | Li | G06F 1/263 713/300 |
| 2014/0101462 A1 | 4/2014 | Rose et al. | |
| 2014/0298349 A1 | 10/2014 | Jackson | |
| 2016/0109916 A1 | 4/2016 | Li et al. | |
| 2016/0247085 A1* | 8/2016 | Harper, III | G06N 7/01 |
| 2017/0242475 A1 | 8/2017 | Gilboa et al. | |
| 2017/0308071 A1* | 10/2017 | Denome | G05B 19/41885 |
| 2018/0006966 A1* | 1/2018 | James | G05F 1/66 |
| 2018/0052431 A1 | 2/2018 | Shaikh et al. | |
| 2018/0116070 A1 | 4/2018 | Broadbent et al. | |
| 2019/0172025 A1 | 6/2019 | Vieri | |
| 2020/0297269 A1 | 9/2020 | Vieri | |
| 2021/0021126 A1 | 1/2021 | Hall et al. | |
| 2021/0027223 A1 | 1/2021 | Kolde | |
| 2021/0111585 A1 | 4/2021 | McNamara et al. | |
| 2021/0318735 A1 | 10/2021 | Barbour | |
| 2022/0173597 A1* | 6/2022 | Walsh | H04L 9/50 |

FOREIGN PATENT DOCUMENTS

| | | |
|---|---|---|
| CN | 206807028 U | 12/2017 |
| CN | 108736471 A | 11/2018 |
| CN | 110912141 A | 3/2020 |
| CN | 112395161 A | 2/2021 |
| CN | 212723926 U | 3/2021 |
| CN | 111966202 B | 6/2021 |
| CN | 112886594 A | 6/2021 |
| CN | 213585162 U | 6/2021 |
| CN | 113131584 A | 7/2021 |
| CN | 213693150 U | 7/2021 |
| CN | 112445302 B | 8/2021 |
| CN | 113364026 A | 9/2021 |
| CN | 113472020 A | 10/2021 |
| JP | 2020057427 A | 4/2020 |
| JP | 2020098393 A | 6/2020 |
| KR | 102033729 B1 | 10/2019 |
| KR | 102110656 B1 | 5/2020 |
| KR | 102117596 B1 | 6/2020 |
| WO | 2017012371 A1 | 1/2017 |
| WO | 2017021153 A1 | 2/2017 |
| WO | 2017021155 A1 | 2/2017 |
| WO | 2017167549 A1 | 10/2017 |
| WO | 2019097546 A1 | 5/2019 |
| WO | 2019139633 A1 | 7/2019 |
| WO | 2021110905 A1 | 6/2021 |

OTHER PUBLICATIONS

Pourmousavi, S.A., Nehrir, M.H., Colson, C.M. and Wang, C., 2010. "Real-time energy management of a stand-alone hybrid

(56) References Cited

OTHER PUBLICATIONS wind-microturbine energy system using particle swarm optimization." IEEE Transactions on Sustainable Energy, 1(3), pp. 193-201. (Year: 2010).*

Ahmad, A., Khan, A., Javaid, N., Hussain, H.M., Abdul, W., Almogren, A., Alamri, A. and Azim Niaz, I., 2017. An optimized home energy management system with integrated renewable energy and storage resources. Energies, 10(4), p. 549. describes an optimized home energy management system (OHEMS). (Year: 2017).*

"Connecting the Blockchain to the Sun to Save the Planet", by Luke P. Johnson et al., Published in ISRN Electronic Journal, Published on [Jan. 2015] https://bit.ly/3KsAuip.

"SEEDS: A Solar-Based Energy-Efficient Distributed Server Farm", by Cheng, Chien-Ming et al., Published in IEEE Transactions on Systems, Man, and Cybernetics: Systems, Published on [Jul. 1, 2014] https://sci-hub.hkvisa.net/10.1109/TSMC.2014.2329277.

"Feasibility Model For Solar-powered Cryptocurrency Mining Setups", by Naveed ur Rehman et al., Published in Southern Institute of Technology Journal of Applied Research, Published on [Oct. 2021] https://bit.ly/3rycvpd.

"Cryptocurrency mining using renewable energy", by Larisa Govender, Published in ARCADA, Published on [2019] https://www.theseus.fi/bitstream/handle/10024/172522/Govender%20Larisa_Thesis.pdf?sequence=2.

"Rooftop Solar and Crypto Mining Could Kick off a Green Power Revolution", by Thomas Smith, Published on [Sep. 20, 2021] https://onezero.medium.com/rooftop-solar-and-crypto-mining-could-kick-off-a-green-power-revolution-ad91d523b35b.

"Cryptocurrency mining using renewable energy", by All Naderzadeh, Published in Fork Mining FMT, Published on [May 28, 2021] https://forkmining.com/FMTFiles/FMT-WhitePaper.pdf.

"Blockchain Mining Of Cryptocurrencies As Challenge And Opportunity For Renewable Energy", by Dmitrijs Rusovs et al., Published in 2018 IEEE 59th International Scientific Conference on Power and Electrical Engineering of Riga Technical University (RTUCON), Published on [Nov. 2018] https://bit.ly/3BthDQe.

"A Survey on Green-Energy-Aware Power Management for Datacenters", by Fanxin Kong, Published in ACM Computing Surveys, vol. 47, No. 2, Article 30, Published on [Nov. 2014] https://sci-hub.hkvisa.net/10.1145/2642708.

"Power Consumption Cost Optimization Using Solar Photovoltaic Systems for Data Centers", by Alireza Eshraghi, Published in 2018 North American Power Symposium (NAPS), Published on [Sep. 2018] https://sci-hub.hkvisa.net/10.1109/naps.2018.8600613.

"Scheduling Computing Loads for Improved Utilization of Solar Energy", by Divya Sharma et al., Published in Sustainable Computing: Informatics and Systems, Published on [Aug. 2, 2021] https://bit.ly/3GYu0ov.

* cited by examiner

OPTIMIZATION AND MANAGEMENT OF RENEWABLE ENERGY SOURCE BASED POWER SUPPLY FOR EXECUTION OF HIGH COMPUTATIONAL WORKLOADS

CLAIM OF PRIORITY

This Application is a Continuation-in-Part Application of co-pending U.S. patent application Ser. No. 17/671,579 titled OPTIMIZATION AND MANAGEMENT OF POWER SUPPLY FROM AN ENERGY STORAGE DEVICE CHARGED BY A RENEWABLE ENERGY SOURCE IN A HIGH COMPUTATIONAL WORKLOAD ENVIRONMENT filed on Feb. 14, 2022, co-pending U.S. patent application Ser. No. 17/590,826 titled SOLAR POWER DISTRIBUTION AND MANAGEMENT FOR HIGH COMPUTATIONAL WORKLOADS filed on Feb. 2, 2022, co-pending U.S. patent application Ser. No. 17/579,628 titled RENEWABLE ENERGY SOURCE BASED POWER DISTRIBUTION AND MANAGEMENT FOR CRYPTOCURRENCY MINING filed on Jan. 20, 2022, co-pending U.S. patent application Ser. No. 17/574,592 titled SOLAR POWER DISTRIBUTION AND MANAGEMENT FOR CRYPTOCURRENCY MINING filed on Jan. 13, 2022, and co-pending U.S. patent application Ser. No. 17/005,318 titled CRYPTOCURRENCY MINING DATA CENTER WITH A SOLAR POWER DISTRIBUTION AND MANAGEMENT SYSTEM filed on Aug. 28, 2020. U.S. patent application Ser. No. 17/671,579 is a Continuation-in-Part Application of U.S. patent application Ser. No. 17/590,826, U.S. patent application Ser. No. 17/579,628, U.S. patent application Ser. No. 17/574,592 and U.S. patent application Ser. No. 17/005,318. U.S. patent application Ser. No. 17/590,826 is a Continuation-in-Part Applications of U.S. patent application Ser. No. 17/579,628, U.S. patent application Ser. No. 17/574,592 and U.S. patent application Ser. No. 17/005,318. U.S. patent application Ser. No. 17/579,628 is a Continuation-in-Part Applications of U.S. patent application Ser. No. 17/574,592 and U.S. patent application Ser. No. 17/005,318. U.S. patent application Ser. No. 17/574,592 is a Continuation Application of U.S. patent application Ser. No. 17/005,318, which itself is a Continuation-in-Part Applications of U.S. patent application Ser. No. 16/115,623 titled CRYPTOCURRENCY PROCESSING CENTER SOLAR POWER DISTRIBUTION ARCHITECTURE filed on Aug. 29, 2018 and issued as U.S. Pat. No. 10,795,428 on Oct. 6, 2020. The contents of all of the aforementioned applications are incorporated by reference in entirety thereof.

FIELD OF TECHNOLOGY

This disclosure relates generally to energy management systems and, more particularly, to a method, a device and/or a system of optimization and management of renewable energy source based power supply for execution of high computational workloads.

BACKGROUND

One of the biggest costs in operating a cryptocurrency data center may be power cost. Power is needed to operate mining nodes and storage systems (e.g., collectively "mining servers"). Since each mining node of the cryptocurrency data center may heat up, more power may be needed in order to provide other cooling systems. Each mining node may be a powerful computer that runs the cryptocurrency software and helps to keep a cryptocurrency network running by participating in the relay of information.

Each mining node can operate when a user (e.g., called a miner) downloads a cryptocurrency software and leaves a certain port open for mining cryptocurrency. The mining node may consume continuous amounts of energy in predictable patterns and massive amounts of storage space (e.g., 150 gigabytes).

SUMMARY

Disclosed are a method and/or systems of optimization and management of renewable energy source based power supply for execution of high computational workloads.

In one aspect, a method includes selectably controlling a power supply from a renewable energy source based power system and an energy storage device charged by the renewable energy source based power system and/or an Alternating Current (AC) power system to a computing system including one or more data processing device(s) and a set of loads associated therewith using an electronic control system, and continuously updating, through a computing power management system associated with the electronic control system, a parameter of operation of the one or more data processing device(s) and/or the set of loads in response to analyzing, through the computing power management system, data pertinent to prior energy usage, prior energy production, predicted energy usage and/or predicted energy production relevant to execution of a high computational workload through the one or more data processing device(s).

The data is received from the one or more data processing device(s), the renewable energy source based power system, the energy storage device and/or the set of loads, and the high computational workload requires at least 50% utilization of a maximum rated power consumption of the one or more data processing device(s) therethrough per day, less than 50% idle time of the one or more data processing device(s) per day, and at least 1 kilowatt hour (KWh) of power consumption through the one or more data processing device(s) per day. The method also includes optimizing the power supply from the renewable energy source based power system and/or the energy storage device to the one or more data processing device(s) using the computing power management system based on the continuously updated parameter of operation of the one or more data processing device(s) and/or the set of loads.

In another aspect, a computing power supply system includes a renewable energy source based power system, an electronic control system to selectably control a power supply from the renewable energy source based power system and an energy storage device charged by the renewable energy source based power system and/or an AC system to a computing system including one or more data processing device(s) and a set of loads associated therewith, and a computing power management system associated with the electronic control system to continuously update a parameter of operation of the one or more data processing device(s) and/or the set of loads in response to analyzing, through the computing power management system, data pertinent to prior energy usage, prior energy production, predicted energy usage and/or predicted energy production relevant to execution of a high computational workload through the one or more data processing device(s).

The data is received from the one or more data processing device(s), the renewable energy source based power system, the energy storage device and/or the set of loads, and the high computational workload requires at least 50% utilization of a maximum rated power consumption of the one or more data processing device(s) therethrough per day, less than 50% idle time of the one or more data processing device(s) per day, and at least 1 KWh of power consumption through the one or more data processing device(s) per day. The computing power management system optimizes the power supply from the renewable energy source based power system and/or the energy storage device to the one or more data processing device(s) based on the continuously updated parameter of operation of the one or more data processing device(s) and/or the set of loads.

In yet another aspect, a computing system includes one or more data processing device(s), a set of loads associated with the one or more data processing device(s), a renewable energy source based power system, an electronic control system to selectably control a power supply from the renewable energy source based power system and an energy storage device charged by the renewable energy source based power system and/or an AC system to the one or more data processing device(s), and a computing power management system associated with the electronic control system to continuously update a parameter of operation of the one or more data processing device(s) and/or the set of loads in response to analyzing, through the computing power management system, data pertinent to prior energy usage, prior energy production, predicted energy usage and/or predicted energy production relevant to execution of a high computational workload through the one or more data processing device(s).

The data is received from the one or more data processing device(s), the renewable energy source based power system, the energy storage device and/or the set of loads, and the high computational workload requires at least 50% utilization of a maximum rated power consumption of the one or more data processing device(s) therethrough per day, less than 50% idle time of the one or more data processing device(s) per day, and at least 1 KWh of power consumption through the one or more data processing device(s) per day. The computing power management system optimizes the power supply from the renewable energy source based power system and/or the energy storage device to the one or more data processing device(s) based on the continuously updated parameter of operation of the one or more data processing device(s) and/or the set of loads.

The methods and systems disclosed herein may be implemented in any means for achieving various aspects, and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
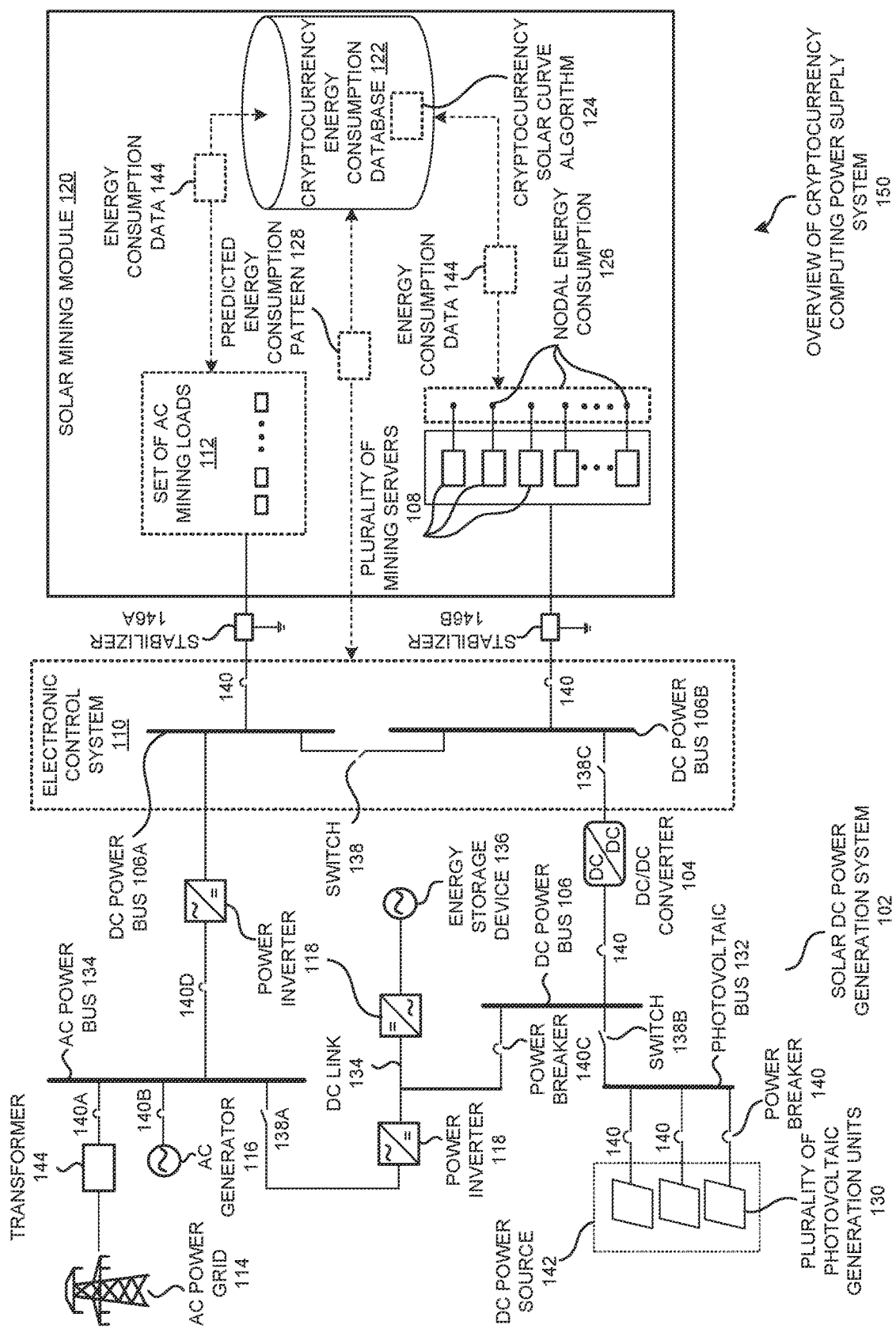
FIG. 1 is a structural overview of a cryptocurrency computing power supply system illustrating the optimization of power distribution using a cryptocurrency solar curve algorithm of a cryptocurrency energy consumption database of a solar mining module, according to one embodiment.

Other features of the present embodiments will be apparent from the accompanying drawings and from the detailed description that follows.

DETAILED DESCRIPTION

Example embodiments, as described below, may be used to provide a method, a device and/or a system of optimization and management of renewable energy source based power supply for execution of high computational workloads.

In one embodiment, a modular cryptocurrency computing power supply system includes a solar DC power generation system 102, a DC power bus 106, an electronic control system 110 and a solar mining module 120 (e.g., mining node power management system). The solar DC power generation system 102 is structured to provide DC power to a DC/DC converter 104. The DC power bus 106 is structured to selectably receive power from the DC/DC converter 104 and to provide DC power to a plurality of mining servers 108.

The electronic control system 110 is structured to selectably control the modular cryptocurrency computing power supply system to operate in plurality of modes. In a first mode, at least some of a set of AC mining loads 112 are powered by an AC power grid 114 and an AC generator 116, and the plurality of mining servers 108 are powered by the solar DC power generation system 102. In a second mode, at least some of the set of AC mining loads 112 are powered by the solar DC power generation system 102 using a power inverter 118 along with the plurality of mining servers 108 powered by the solar DC power generation system 102.

The solar mining module 120 (e.g., mining node power management system) includes optimizing power distribution from the solar DC power generation system 102 to the plurality of mining servers 108 using a cryptocurrency solar curve algorithm 124 generated based on an analysis of statistically predicted patterns of energy usage and/or production. The analysis of statistically predicted patterns of energy usage and/or production is based on computational needs of known mathematical puzzles being solved by groups of the plurality of mining nodes (e.g., plurality of mining servers 108) seeking to add outstanding transactions grouped into blocks to a blockchain database associated with a specific type of cryptocurrency.

The solar DC power generation system 102 may include a plurality of photovoltaic generation units 130, a photovoltaic bus 132 and a second converter. The photovoltaic bus 132 may be operatively coupled with the plurality of photovoltaic generation units 130 and/or the DC/DC converter 104. The second converter may include a DC link operatively coupled with the photovoltaic bus 132, a first output operatively coupled with an AC power bus 134 and a second output operatively coupled with an energy storage device 136. The energy storage device 136 may include an electric machine coupled with a flywheel, a battery, and/or a supercapacitor.

The electronic control system 110 may be structured to control the modular cryptocurrency computing power supply system to selectably supply power from the AC power bus 134 and/or the solar DC power generation system 102 to the energy storage device 136.

The electronic control system 110 may be structured to selectably supply power from the energy storage device 136 to the AC power bus 134 and/or the photovoltaic bus 132.

The electronic control system 110 may be structured to route power from the energy storage device 136 to the photovoltaic bus 132 and/or the AC power bus 134 during a transition from the first mode and/or the second mode.

The solar DC power generation system 102 may include a plurality of fuel cells structured to output DC power to the DC/DC converter 104. The electronic control system 110 may be structured to control the modular cryptocurrency computing power supply system to selectably supply power from the plurality of fuel cells to the DC power bus 106 alone and/or a combination of the DC power bus 106 and the AC power bus 134.

The solar DC power generation system 102 may include a solar DC power source 142, a second DC power bus 106, and a second converter. The second DC power bus 106 may be operatively coupled with the solar DC power source 142 and the DC/DC converter 104.

The second converter may be operatively coupled with the second DC power bus 106. A first output of the second converter may be operatively coupled with the AC power bus 134 and a second output may be operatively coupled with the energy storage device 136.

In another embodiment, a method of a cryptocurrency computing power supply system includes structuring a solar DC power generation system 102 to provide DC power to a DC/DC converter 104. The method includes structuring a DC power bus 106 to selectably receive power from the DC/DC converter 104 and providing DC power to a plurality of mining servers 108 using the DC power bus 106. The method further includes selectably controlling the cryptocurrency computing power supply system using an electronic control system 110 structured to operate in plurality of modes. In a first mode, at least some of a set of AC mining loads 112 are powered by an AC power grid 114 and an AC generator 116, and the plurality of mining servers 108 are powered by the solar DC power generation system 102. In a second mode, at least some of the set of AC mining loads 112 are powered by the solar DC power generation system 102 using a power inverter 118 along with the plurality of mining servers 108 powered by the solar DC power generation system 102.

The method further includes applying a cryptocurrency solar curve algorithm 124 of a solar mining module 120 (e.g., mining node power management system) based on an analysis of statistically predicted patterns of energy usage and/or production. The analysis of statistically predicted patterns of energy usage and/or production is based on computational needs of known mathematical puzzles being solved by groups of the plurality of mining nodes seeking to add outstanding transactions grouped into blocks to a blockchain database associated with a specific type of cryptocurrency. Furthermore, the method includes optimizing a distribution of power from the solar DC power generation system 102 to the plurality of mining servers 108 using the solar mining module 120 (e.g., mining node power management system).

The method may further include operatively coupling a plurality of photovoltaic generation units 130 with a photovoltaic bus 132 and/or the DC/DC converter 104 to form the solar DC power generation system 102. The method may operatively couple a second converter including a DC link with the photovoltaic bus 132. A first output may be operatively coupled with an AC power bus 134. A second output may be operatively coupled with an energy storage device 136.

The energy storage device 136 may include an electric machine coupled with a flywheel, a battery, and/or a supercapacitor. The method may further include controlling the cryptocurrency computing power supply system to selectably supply power from the AC power bus 134 and/or the solar DC power generation system 102 to the energy storage device 136 using the electronic control system 110.

The method may further include selectably supplying power from the energy storage device 136 to the AC power bus 134 and/or the photovoltaic bus 132 using the electronic control system 110. In addition, the method may include routing power from the energy storage device 136 to the photovoltaic bus 132 and/or the AC bus during a transition from the first mode and/or the second mode using the electronic control system 110. The solar DC power generation system 102 may include a plurality of fuel cells structured to output DC power to the DC/DC converter 104.

The method may include controlling the cryptocurrency computing power supply system to selectably supply power from the plurality of fuel cells to the DC power bus 106 alone and/or a combination of the DC power bus 106 and the AC power bus 134 using the electronic control system 110.

The method of solar DC power generation system 102 may include a solar DC power source 142, a second DC power bus 106 and a second converter. The second DC power bus 106 may be operatively coupled with the solar DC power source 142 and the DC/DC converter 104. The second converter may be operatively coupled with the second DC power bus 106. The second converter may include a first output operatively coupled with the AC power bus 134 and a second output operatively coupled with the energy storage device 136.

In yet another embodiment, a cryptocurrency computing power supply system includes a plurality of computers operating as a plurality mining servers, a solar DC power generation system 102, a DC power bus 106, an electronic control system 110, and a solar mining module 120 (e.g., mining node power management system). The plurality mining servers continuously consume energy in a predictable pattern based on a type of cryptocurrency being mined. The solar DC power generation system 102 is structured to provide DC power to a DC/DC converter 104. The DC power bus 106 is structured to selectably receive power from the DC/DC converter 104 and to provide DC power to the plurality of mining servers 108.

The electronic control system 110 is structured to selectably control the cryptocurrency computing power supply system to operate in plurality of modes. In a first mode, at least some of a set of AC mining loads 112 are powered by an AC power grid 114 and/or an AC generator 116, and the plurality of mining servers 108 are powered by the solar DC power generation system 102. In a second mode, at least some of the set of AC mining loads 112 are powered by the solar DC power generation system 102 using a power inverter 118 along with the plurality of mining servers 108 powered by the solar DC power generation system 102.

The solar mining module 120 (e.g., mining node power management system) optimizes the power distribution from the solar DC power generation system 102 to the plurality of mining servers 108 using a cryptocurrency solar curve algorithm 124 generated based on an analysis of statistically predicted patterns of energy usage and/or production. The analysis of statistically predicted patterns of energy usage and/or production is based on computational needs of known mathematical puzzles being solved by groups of the plurality of mining nodes seeking to add outstanding transactions grouped into blocks to a blockchain database associated with the type of cryptocurrency being mined.

The solar DC power generation system 102 may include a plurality of photovoltaic generation units 130, a photovoltaic bus 132, and a second converter. The photovoltaic bus 132 may be operatively coupled with the plurality of photovoltaic generation units 130 and the DC/DC converter 104. The second converter may include a DC link operatively coupled with the photovoltaic bus 132. A first output may be operatively coupled with an AC power bus 134 and a second output may be operatively coupled with an energy storage device 136.

FIG. 1 is a structural overview of a cryptocurrency computing power supply system 150 illustrating the optimization of power distribution using a cryptocurrency solar curve algorithm 124 of a cryptocurrency energy consumption database 122 of a solar mining module 120 (e.g., mining node power management system), according to one embodiment. Particularly, FIG. 1 illustrates a solar DC power generation system 102, a DC/DC converter 104, a DC power bus 106, 106A, 106B, a plurality of mining servers 108, an electronic control system 110, a set of AC mining loads 112, an AC power grid 114, an AC generator 116, a power inverter 118, a solar mining module 120, a cryptocurrency energy consumption database 122, a cryptocurrency solar curve algorithm 124, a nodal energy consumption 126, predicted energy consumption pattern 128, a plurality of photovoltaic generation units 130, a photovoltaic bus 132, an AC power bus 134, an energy storage device 136, a switch 138, 138A, 138B, a power breaker 140, 140A, 140B, 140C, 140D, a solar DC power source 142, a transformer 144, and a stabilizer 146A, 146B, according to one embodiment.

The solar DC power generation system 102 may be a system of conversion of energy from sunlight into unidirectional flow of electricity (e.g., electric charge), directly using photovoltaics (PV), indirectly using concentrated solar power, and/or a combination thereof. The solar DC power generation system 102 may convert the sun's rays into electricity by exciting electrons in silicon cells using the photons of light from the sun. The solar DC power generation system 102 may use lenses and/or mirrors and tracking systems (e.g., tracker with altitude adjustment 602) to focus a large area of sunlight into a small beam, according to one embodiment.

The DC/DC converter 104 may be an electronic circuit and/or electromechanical device that convert a source of direct current (DC) from one voltage level to another. The DC/DC converter 104 may receive DC power from the solar DC power generation system 102 and transmit it to the DC power bus 106 at a desired voltage level, according to one embodiment.

The DC power bus 106 may be a conductor and/or a group of conductors used for collecting electric power from the incoming DC feeders (e.g., DC power source 142) and distributes them to the outgoing feeders (e.g., power load, set of AC mining loads 112, plurality of mining servers 108). According to once embodiment, the DC power bus 106 may receive power from the AC power grid 114 and/or from the DC power source 142, according to one embodiment.

Further, the DC power bus 106 may be structured to receive power from the DC/DC converter 104 and/or power inverter 118 and distribute them to the plurality of mining servers 108 and/or set of AC mining loads 112, according to one embodiment.

The DC power bus 106B may be configured to discretionarily receive power from the DC/DC converter 104 and to provide DC power to the plurality of mining servers 108. In another embodiment, the DC power bus 106A may be configured to discretionarily receive DC power from the power inverter 118 and to provide AC power to the set of AC mining loads 112, according to one embodiment.

The plurality of mining servers 108 may be a number of computers, and/or a computer programs that is dedicated to managing network resources to solve complex problems to verify digital transactions using computer hardware (e.g., using a graphics card). Each mining node of the plurality of mining servers 108 may be a powerful computer that runs the cryptocurrency software and helps to keep a cryptocurrency network running by participating in the relay of information. Each mining node of the plurality of mining servers 108 may consume continuous amounts of energy in predictable patterns and massive amounts of storage space, according to one embodiment.

The electronic control system 110 may be a physical interconnection of devices that influences the behaviour of other devices and/or systems (e.g., plurality of mining servers 108). The electronic control system 110 may be defined as a process that transforms one signal into another so as to give the desired system response. The electronic control system 110 may be configured to discretionarily control the cryptocurrency computing power supply system to operate in plurality of modes. In a first mode, the electronic control system 110 may enable the set of AC mining loads 112 to be powered by the AC power grid 114 and the AC generator 116, and the plurality of mining servers 112 to be powered by the solar DC power generation system 102. In a second mode, the electronic control system 110 may enable some of the set of AC mining loads 112 to be powered by the solar DC power generation system 102 using the power inverter 118 along with the plurality of mining servers 108 to be powered by the solar DC power generation system 102, according to one embodiment.

The set of AC mining loads 112 may be the electrical power consumed by a number of networked computers and/or storage that an array of solar mining modules 120 (e.g., mining node power management system) use to organize, process, store and disseminate large amounts of data. The set of AC mining loads 112 may include the electrical power consumed for running the plurality of mining servers 108 and providing air conditioning and other cooling systems of the cryptocurrency farm, according to one embodiment.

The AC power grid 114 may be an interconnected network for delivering alternating current from producers to consumers. The AC power grid 114 may consist of generating stations that produce electrical power, high voltage transmission lines that carry power from distant sources to demand centers (e.g., plurality of mining servers 108, set of AC mining loads 112), and distribution lines that connect individual customers (e.g., mining server). The AC power grid 114 may deliver alternating current to the plurality of mining servers 108 and/or set of AC mining loads 112. The AC power grid 114 may be operatively coupled to the AC power bus 134 by way of transformer 144 and the power breaker 140, according to one embodiment.

The AC generator 116 may be an electrical device which converts mechanical energy to electrical energy to power the plurality of mining servers 108 and/or the set of AC mining loads 112 of the cryptocurrency mining system, according to one embodiment.

The power inverter 118 may be an electronic device and/or circuitry that changes direct current (DC) to alternating current (AC). The power inverter 118 may convert the direct current (DC) from the DC power source 142 to alternating current (AC), according to one embodiment.

The solar mining module 120 (e.g., mining node power management system) may be a collection of elements and/or components that are organized for a common purpose of controlling the power supply to each of the mining nodes of the plurality of mining servers 108 and the set of AC mining loads 112, according to one embodiment.

The cryptocurrency energy consumption database 122 may be an organized collection of information of energy consumption by the plurality of mining servers 108 and the set of AC mining loads 112 that can be easily accessed, managed and updated by the solar mining module 120 (e.g., mining node power management system), according to one embodiment.

The cryptocurrency solar curve algorithm 124 may be a process and/or set of rules that need to be followed for calculating the predicted energy consumption pattern 128 of the plurality of mining servers 108, according to one embodiment. The nodal energy consumption 126 may be the amount of power utilized for running each node of the plurality of mining servers 108 and the set of AC mining loads 112.

The predicted energy consumption pattern 128 may be an estimated amount of power consumption calculated based on the analysis of large quantity of numerical data of predicted patterns of energy usage by the plurality of mining servers 108 using the cryptocurrency solar curve algorithm 124 of the cryptocurrency energy consumption database 122. The predicted energy consumption pattern 128 may be based on the energy consumption data 144 received from the plurality of mining servers 108 and/or the set of AC mining loads, according to one embodiment.

The plurality of photovoltaic generation units 130 may be a power generation system designed to convert the solar light into electricity using semiconducting materials that exhibit the photovoltaic effect. The plurality of photovoltaic generation units 130 may supply usable solar power by means of photovoltaics. The plurality of photovoltaic generation units 130 may consist of an arrangement of several components, including solar panels to absorb and convert sunlight into electricity, a solar inverter to change the electric current from DC to AC, as well as mounting, cabling, and other electrical accessories to set up a working system, according to one embodiment.

The photovoltaic bus 132 may be a conductor and/or a group of conductors used for collecting electric power from the plurality of photovoltaic generation units 130 and distribute them to the outgoing feeders (e.g., power load, DC power bus 106), according to one embodiment.

The AC power bus 134 may be a conductor and/or a group of conductors used for collecting electric power from the AC power grid 114 and distributing them to the outgoing feeders (e.g., power load, plurality of mining servers 108, set of AC mining loads 112). The AC power bus 134 may be a vertical line at which the several components of the power system like AC generators, loads, and feeders, etc., are connected, according to one embodiment.

The energy storage device 136 may be a device that stores energy for later use. The energy storage device 136 may store energy supplied from the DC power source 142 and/or from the AC power grid 114 to be used at the time power supply failure from any one of the two. According to one embodiment, the energy storage device 136 may be an electric machine coupled with a flywheel, a battery, and/or a supercapacitor. The energy storage device 136 may be coupled to the power inverter 118 which is configured to receive the DC power, convert it to the AC power, and provide AC power to the plurality of mining servers 108 and/or set of AC mining loads 112, according to one embodiment.

The switch 138 may be a device for making and breaking the connection in an electric circuit. The switch 138 may be used by the electronic control system 110 to control the continuous power supply to the plurality of mining servers 108 and/or the set of AC mining loads 112, according to one embodiment.

The power breaker 140 may be an automatically operated electrical switch designed to protect an electrical circuit from damage caused by excess current from an overload and/or short circuit. Circuit breakers (e.g., power breaker 140) may also be used in the event of pre-existing damage to electrical systems in the cryptocurrency computing power supply system. The power breaker 140 may be configured to disrupt the flow of current between the AC power grid 114 and AC power bus 134 to protect the electrical circuit of cryptocurrency computing power supply system from damage caused by excess current from an overload and/or short circuit. In various embodiments, the power breaker 140 may be designed to automatically disrupt the flow of current in a particular segment to isolate it from the rest of circuitry of the cryptocurrency computing power supply system to enable uninterrupted power supply to the rest of cryptocurrency mining circuitry, according to one embodiment.

The solar DC power source 142 may be a power generation system to produce DC power using solar energy. The solar DC power source 142 may include a plurality of photovoltaic generation units 130 to generate DC power, according to one embodiment.

The transformer 144 may be a static electrical device that transfers electrical energy between two or more circuits through electromagnetic induction. The transformer 144 may be used to transfer AC power from the AC power grid 114 by increasing or decreasing the alternating voltages to the supply to the plurality of mining servers 108 and/or the set of AC mining loads 112, according to one embodiment.

The stabilizer 146 may be an electrical device used to feed constant voltage current to electrical load. The stabilizer 146 may be an electronic device responsible for correcting the voltage of the electrical power supply to provide a stable and secure power supply to the electrical load of cryptocurrency mining (e.g., plurality of mining servers 108, set of AC mining loads 112). The stabilizer 146 may allow for a stable voltage and protect the equipment from most of the problems of the mains of the of cryptocurrency computing power supply system, according to one embodiment.

In another embodiment, the stabilizer 146A may be configured to receive DC power from the DC power bus 106A and supply a stable AC power to the set of AC mining loads 112. The stabilizer 146B may be structured to receive DC power from the DC power bus 106B and supply DC power to the plurality of mining servers at a constant voltage.

Figure 2A:
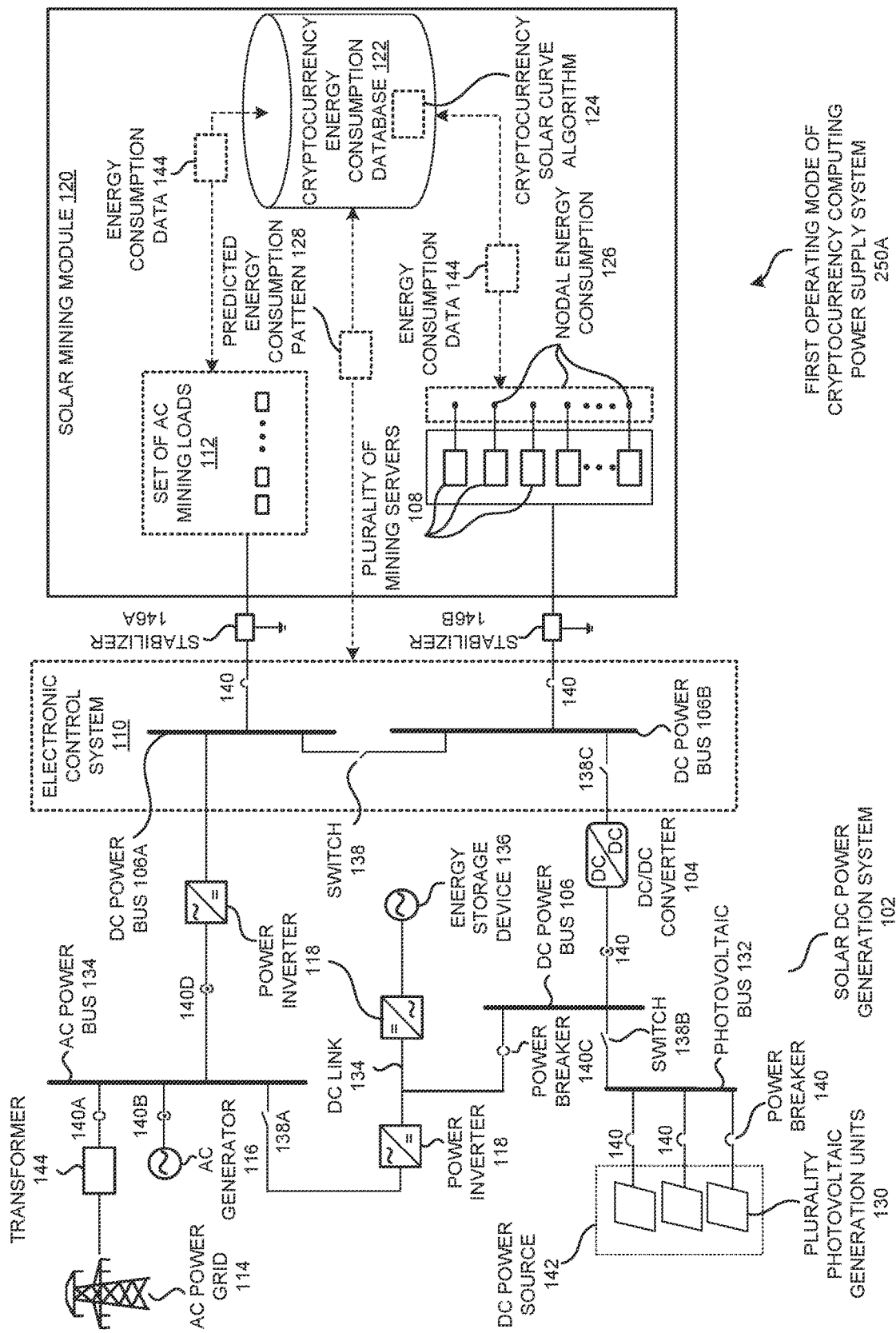
FIG. 2A is an overview illustrating a system of cryptocurrency computing power supply system of FIG. 1 operated in a first mode, according to one embodiment.

FIG. 2A is an overview illustrating a system of the cryptocurrency computing power supply system 250A of FIG. 1 operated in a first mode, according to one embodiment. The electronic control system 110 may be configured to discretionarily control the power supply to the set of AC mining loads 112 and the plurality of mining servers 112.

The electronic control system 110 may be structured to regulate the power supply to the set of AC mining loads 112 and the plurality of mining servers 112 by controlling the power breakers 140, switches 138, DC/DC converter 104, power inverter 118, stabilizer 146 and AC generator 116 of the cryptocurrency computing power supply system, according to one embodiment.

The electronic control system 110 may be configured such that in the first operating mode, the set of AC mining loads 112 is powered by the AC power grid 114 and the AC generator 116, and the plurality of mining servers 112 is powered by the solar DC power generation system 102, according to one embodiment.

In the first operating mode, the electronic control system 110 may actuate the AC generator 116, and open power breakers 140A, 140C, and opens switch 138A, in order to power the set of AC mining loads 112 using AC power generated from the AC power grid 114 and the AC generator 116 and the plurality of mining servers 112 is powered by the solar DC power generation system 102, according to one embodiment.

Figure 2B:
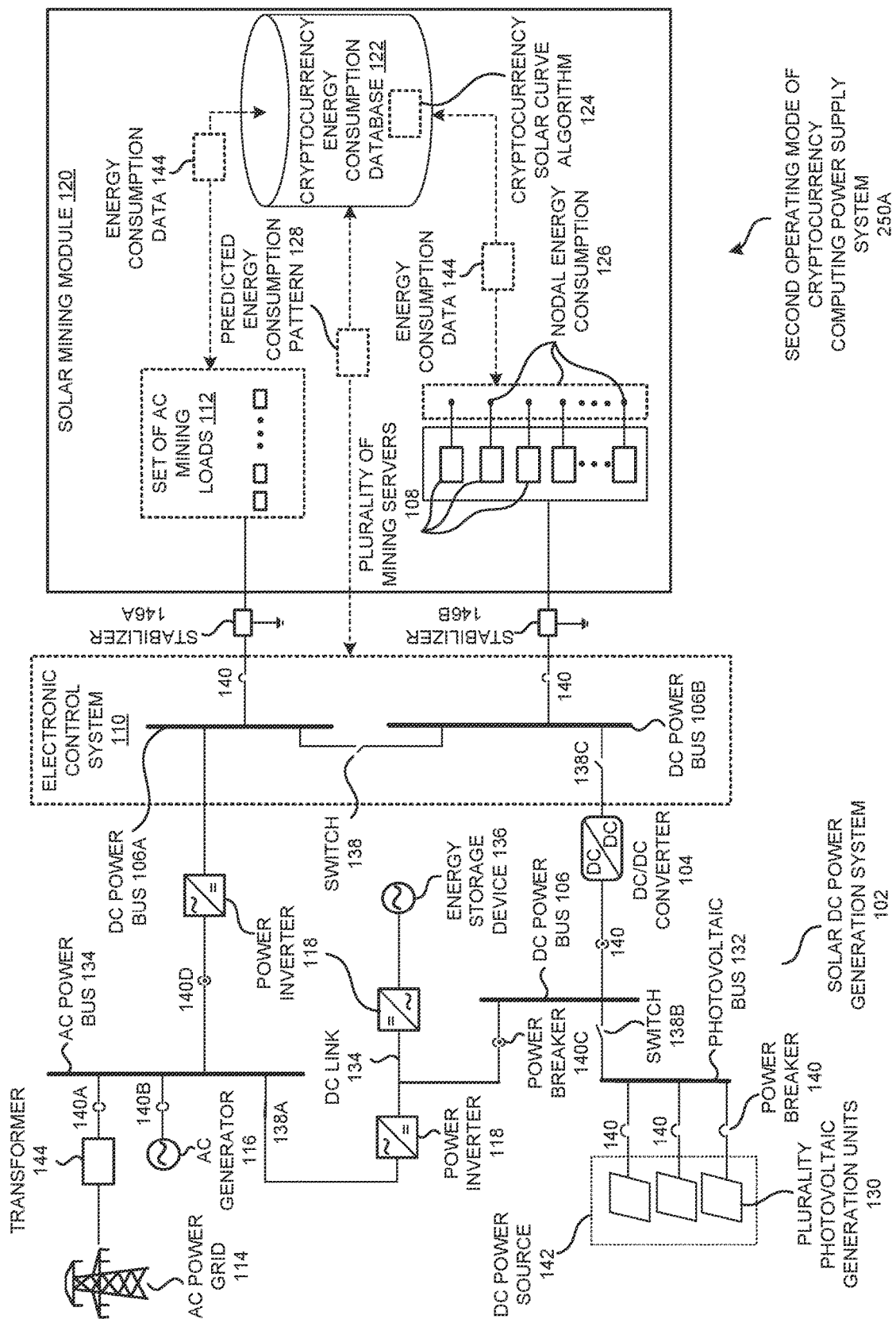
FIG. 2B another overview illustrating the system of cryptocurrency computing power supply system of FIG. 1 operated in a second mode, according to one embodiment.

FIG. 2B is another overview illustrating the system of cryptocurrency computing power supply system 250B of FIG. 1 operated in a second mode, according to one embodiment. In the second operating mode, the electronic control system 110 may be configured such that some of the set of AC mining loads 112 is powered by the solar DC power generation system 102 using the power inverter 118 along with the plurality of mining servers 108 powered by the solar DC power generation system 102, according to one embodiment.

In the second operating mode, the electronic control system 110 may open power breaker 140A and 140B, and closes switch 138A to power the set of AC mining loads 112 from the power generated by the solar DC power generation system 102 using the power inverter 118 along with the plurality of mining servers 108 powered by the solar DC power generation system 102, according to one embodiment.

The electronic control system 110 may manage the power supply to the plurality of mining servers 108 and the set of AC mining loads 112 based on the predicted energy consumption pattern 128 of the solar mining module 120. The solar mining module 120 (an example mining node power management system applying cryptocurrency solar curve algorithm 124) may derive the predicted energy consumption pattern 128 using the cryptocurrency solar curve algorithm 124 of the energy consumption database 122. The electronic control system 110 may manage the power supply based on the predicted energy consumption pattern 128 of the solar mining module 120, according to one embodiment.

Figure 3:
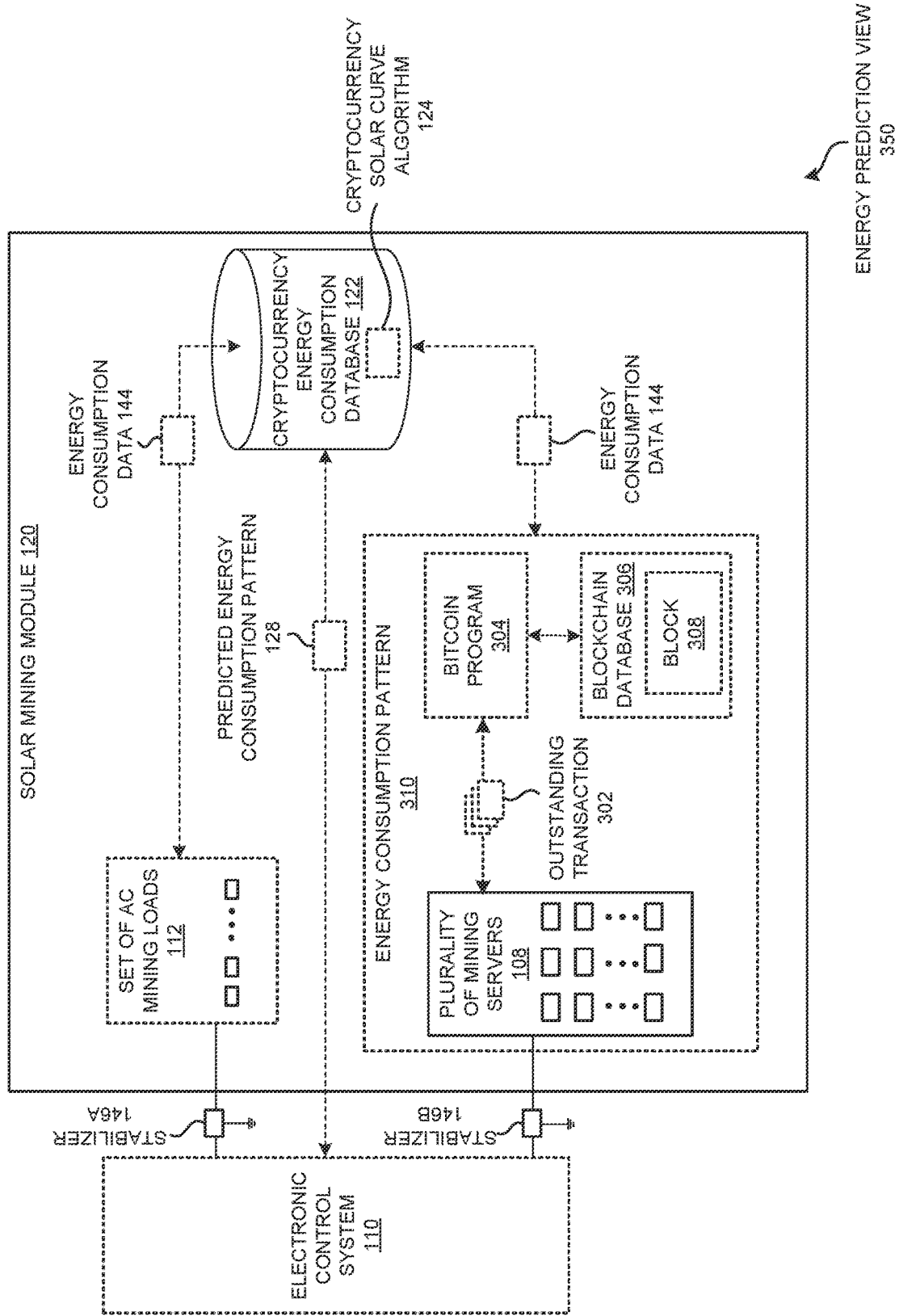
FIG. 3 is an energy prediction view illustrating the energy consumption analysis of plurality of mining servers in the solar mining module (e.g., mining node power management system) of the cryptocurrency computing power supply system of FIG. 1, according to one embodiment.

FIG. 3 is an energy prediction view 350 illustrating the energy consumption analysis of plurality of mining servers 108 in the solar mining module 120 (e.g., mining node power management system applying cryptocurrency solar curve algorithm 124) of cryptocurrency computing power supply system of FIG. 1, according to one embodiment. Particularly, FIG. 3 builds on FIGS. 1 to 2B, and further adds, an outstanding transaction 302, a bitcoin program 304, a blockchain database 306, and a block 308.

The outstanding transaction 302 may be a pending transfer of Bitcoin value that is broadcast to the network and collected into blocks 308 of the blockchain database 306. A transaction may typically reference previous transaction output as new transaction input and dedicate all input Bitcoin values to new outputs, according to one embodiment.

The bitcoin program 304 may be a software program to manage and help a miner of the plurality of mining servers 108 spend bitcoins. The bitcoin program 304 may maintain a long ledger called the blockchain that holds every transaction confirmed by the Bitcoin network. The Bitcoin network may consist of thousands of machines (e.g., plurality of mining servers 108) running the Bitcoin software. The Bitcoin network may have two main tasks to accomplish. One is relaying transaction information and the second is verifying those transactions to ensure the same bitcoins may not be spent twice, according to one embodiment.

The blockchain database 306 may be an assortment of data in the Bitcoin network wherein each participant (e.g., mining node, plurality of mining servers 108) may maintain, calculate and update new entries into the database. All nodes in the Bitcoin network may work together to ensure they are all coming to the same conclusions, providing in-built security for the network, according to one embodiment. The block 308 may be the transaction data that is permanently recorded in files in the blockchain database 306.

The mining nodes (e.g., plurality of mining servers 108) of the cryptocurrency data center may each group outstanding transactions 302 into blocks 308 and add them to a blockchain database 306. For example, the mining nodes (e.g., plurality of mining servers 108) may add transactions to the blockchain database 306 by solving a complex mathematical puzzle that is part of a bitcoin program 304, and including an answer in a block 308. For example, the complex mathematical puzzle that needs solving may be to find a number (e.g., "nonce", which is a concatenation of "number used once." In the case of bitcoin, the nonce is an integer between 0 and 4,294,967,296 that, when combined with the data in the block 308 and passed through a hash function, produces a result that is within a certain range. The number may be found by guessing at random. The hash function may make it impossible to predict what the output will be. So, miners (e.g., plurality of mining servers 108) may guess the mystery number and may apply the hash function to the combination of that guessed number and the data in the block 308. A resulting hash may have to start with a pre-established number of zeroes. There may be no way of knowing which number will work, because two consecutive integers may give wildly varying results. Moreover, there may be several numbers that produce a desired result, or there may be none (in which case the miners keep trying, but with a different block configuration), according to one embodiment.

The first miner to get a resulting hash within the desired range announces its victory to the rest of the network. All the other miners (e.g., plurality of mining servers 108) may immediately stop work on that block 308 and start trying to figure out the mystery number for the next block. As a reward for its work, the victorious miner may receive some new unit of the cryptocurrency, according to one embodiment.

A central processing unit (e.g., CPU, a processor) of each mining node (e.g., plurality of mining servers 108) of the cryptocurrency data center may need to continually process computations as fast as the maximum threshold of the CPU may operationally permit without burning out in order to maximize odds of finding the number. For example, the difficulty of the calculation (e.g., the required number of zeros at the beginning of the hash string) may be adjusted frequently, so that may take on average about 10 minutes to process a block (e.g., the amount of time that the bitcoin developers think is necessary for a steady and diminishing flow of new coins until the maximum number of 21 million is reached), according to one embodiment.

The cryptocurrency data center may have a strategic advantage by spreading increasing the odds that one of the mining nodes in the cryptocurrency data center contains the mystery number, according to one embodiment.

Different embodiments of present disclosure may effectively provide an uninterrupted power supply to the cryptocurrency mining by regulating the power generated by multiple power sources (e.g., solar DC power generation system 102 and/or AC power grid 114) in order to reduce power consumption from a utility grid and reduce the energy cost of the power distribution system. During the day, solar power may be almost free while in the night time utility power may be the cheapest. The electronic control system 110 of the solar mining module 120 (e.g., mining node power management system) may be configured to efficiently address the unique challenges of the cryptocurrency data center including automatic switching to the least expensive power source depending upon the time of the day and clear to cloudy skies, and/or power supply regulation, reliability, power quality, and reducing energy costs and preventing loss of power to the mining, according to one embodiment.

The electronic control system 110 of the solar mining module 120 (e.g., mining node power management system) may uniquely fulfill the power distribution challenges for the cryptocurrency data center caused by the computational complexity, continuous operation, and unique power consumption challenges caused by asymmetric power loads of the cryptocurrency data center by continuously updating the power supply requirement of the cryptocurrency mining based on the predicted energy consumption pattern 128 of the cryptocurrency energy consumption database 122. The electronic control system 110 may automatically control the power distribution to the plurality of mining servers 108 and ensure an uninterrupted power supply to the cryptocurrency data center using the predicted energy consumption pattern 128 derived from the energy consumption data 144 of the set of AC mining loads 112 and plurality of mining servers using the cryptocurrency solar curve algorithm of the cryptocurrency energy consumption database 124, according to one embodiment.

Figure 4A:
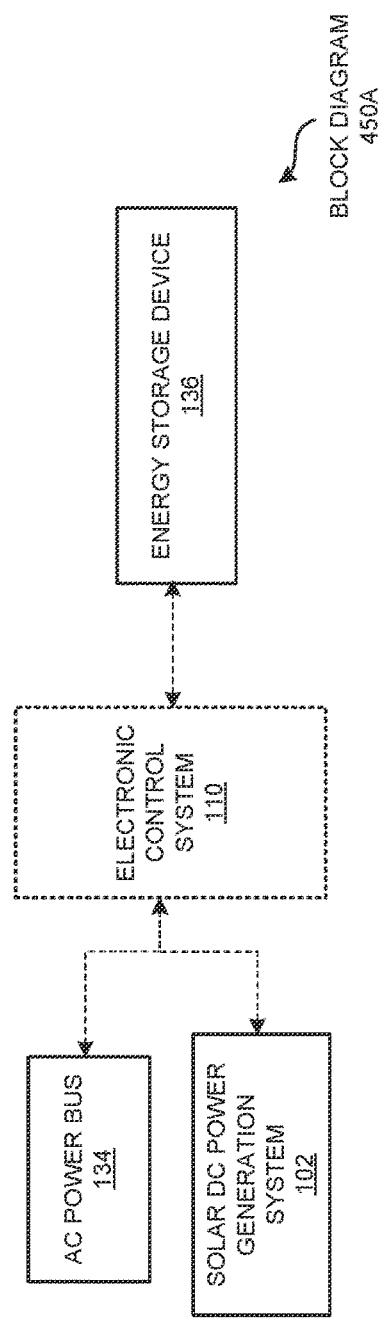
FIG. 4A is a block diagram illustrating an electronic control system of the cryptocurrency computing power supply system of FIG. 1 configured to control the power supply to an energy storage device.

FIG. 4A is a block diagram 450A illustrating an electronic control system 110 of the cryptocurrency computing power supply system of FIG. 1 configured to control the power supply to an energy storage device 136. According to one embodiment, the electronic control system 110 of the cryptocurrency computing power supply system of FIG. 1 may be configured to heterogeneously supply power from the AC power bus 134 and/or the solar DC power generation system 102 to the energy storage device 110 by automatically switching to the least expensive power source depending upon the time of the day and clear to cloudy skies, power supply regulation, reliability, power quality, and reducing energy costs and preventing loss of power to a mining, according to one embodiment.

Figure 4B:
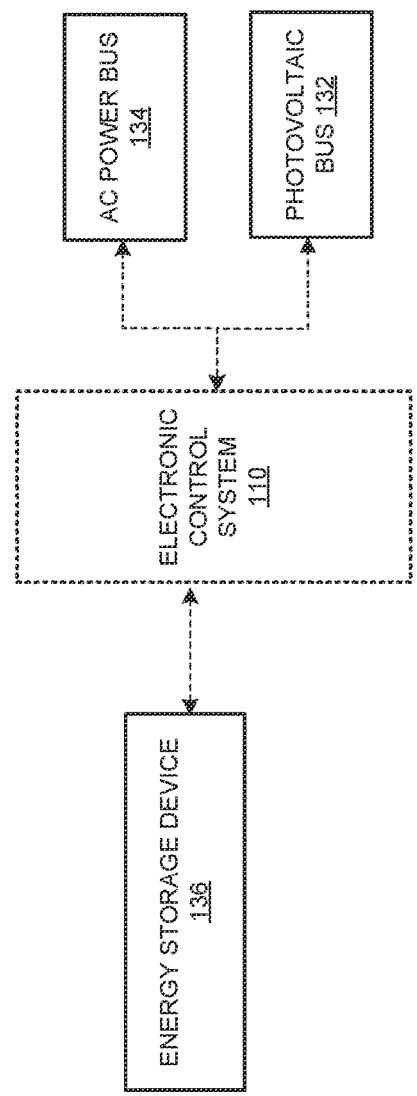
FIG. 4B is another block diagram illustrating the electronic control system of the cryptocurrency computing power supply system of FIG. 1 configured to control the power supply from the energy storage device, according to one embodiment.

FIG. 4B is another block diagram 450B illustrating the electronic control system 110 of the cryptocurrency computing power supply system of FIG. 1 configured to control the power supply from the energy storage device 136, according to one embodiment. The electronic control system 110 of the cryptocurrency computing power supply system of FIG. 1 may be configured to control the power supply from the energy storage device 136 to the AC power bus 134 and/or the photovoltaic bus 132 at the time of power supply failure from the AC power grid 114 and/or solar DC power generation system 102, and to prevent loss of power to the mining. At the time of power supply failure from the AC power grid 114 and/or AC generator 116, the electronic control system 110 may automatically open power breaker 140A and 140B, and close switch 138A and power breaker 140C to ensure continuous power supply to the set of AC mining loads 112 and plurality of mining servers 108 from the energy storage device 136 through the AC power bus 134 and/or the photovoltaic bus 132, according to one embodiment.

Figure 5:
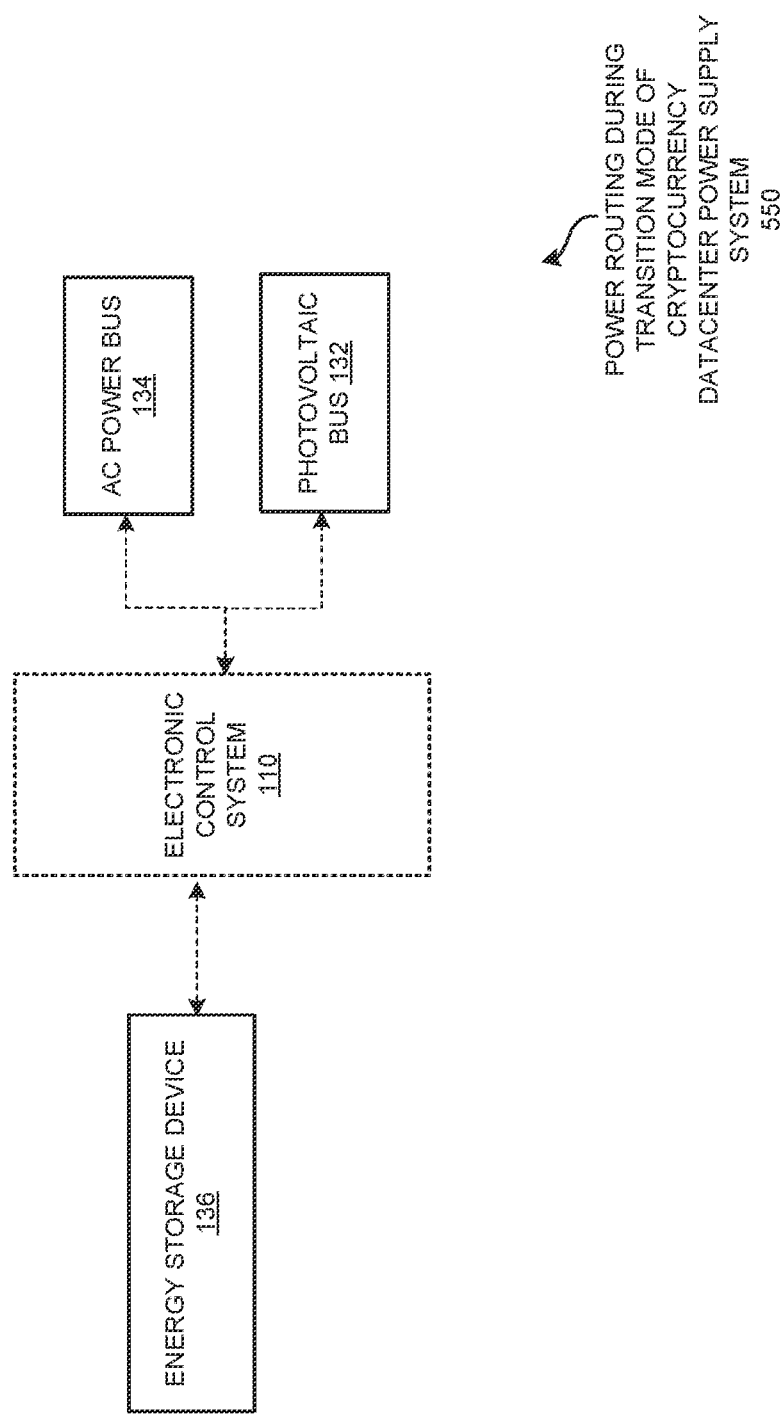
FIG. 5 is a block diagram illustrating the transition mode of the cryptocurrency computing power supply system of FIG. 1, according to one embodiment.

FIG. 5 is a block diagram 550 illustrating the transition mode of the cryptocurrency computing power supply system of FIG. 1, according to one embodiment. During the transition of cryptocurrency computing power supply system from first operating mode to second operating mode, the electronic control system 110 may be structured to route power from the energy storage device 136 to the photovoltaic bus 132 and/or the AC power bus 134. In an alternate embodiment, during the transition of cryptocurrency computing power supply system from second operating mode to first operating mode, the electronic control system 110 may be structured to route power from the energy storage device 136 to the photovoltaic bus 132 and/or the AC power bus 134, according to one embodiment.

Figure 6:
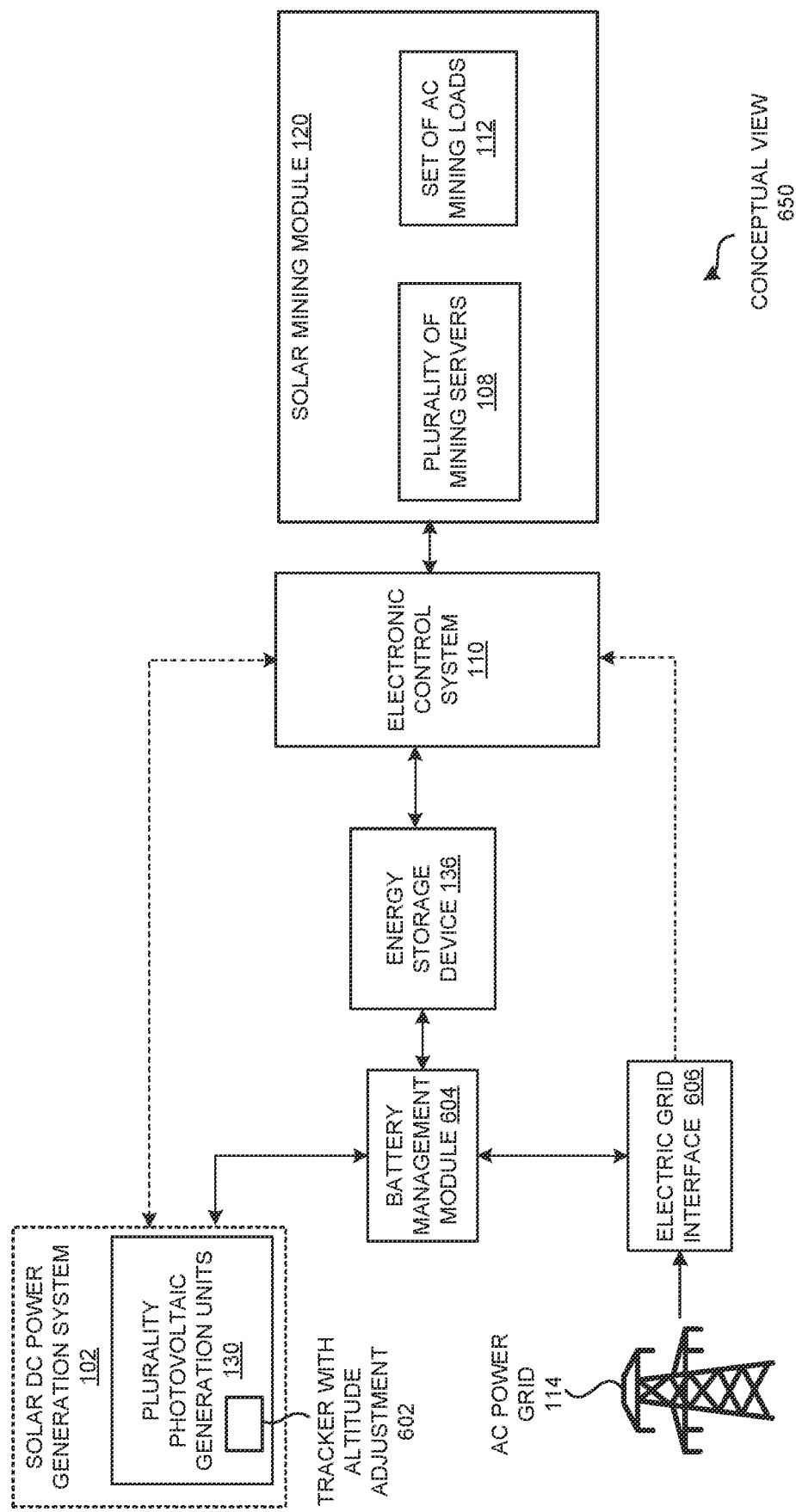
FIG. 6 is a conceptual view illustrating another embodiment of the cryptocurrency computing power supply system of FIG. 1, according to one embodiment.

FIG. 6 is a conceptual view 650 illustrating another embodiment of the cryptocurrency computing power supply system of FIG. 1. Particularly, FIG. 6 builds on FIGS. 1 to 5, and further adds, a tracker with altitude adjustment 602, a battery management module 604, and an electric grid interface 606, according to one embodiment.

The plurality of photovoltaic generation units 130 may have each have a tracker with altitude adjustment 602 to adjust the direction of solar panels and/or modules toward the sun. The plurality of photovoltaic generation units 130 may include a device to change their orientation throughout the day to follow the sun's path to maximize energy capture. The trackers of the plurality of photovoltaic generation units 130 may help minimize the angle of incidence (e.g., the angle that a ray of light makes with a line perpendicular to the surface) between the incoming light and the panel, which increases the amount of energy the installation produces. The single-axis solar tracker may rotate on one axis moving back and forth in a single direction. Different types of single-axis trackers may include horizontal, vertical, tilted, and/or polar aligned, which rotate as the names imply. The conversion efficiency of the plurality of photovoltaic generation units 130 may be improved by continually adjusting the modules of the plurality of photovoltaic generation units 130 to the optimum angle as the sun traverses the sky, according to one embodiment.

Trackers of the plurality of photovoltaic generation units 130 in the cryptocurrency computing power supply system may direct solar panels and/or modules toward the sun. Tracking systems may collect the sun's energy with maximum efficiency when the optical axis is aligned with incident solar radiation, according to one embodiment.

The tracker of the plurality of photovoltaic generation units 130 in the cryptocurrency computing power supply system may help substantially increase the generation potential of the plurality of photovoltaic generation units 130. The solar panels of the plurality of photovoltaic generation units 130 may be tilted at required angles for efficiently increasing power generation. The solar panels of the plurality of photovoltaic generation units 130 may be adjusted at latitude+15 degrees in winter and latitude−15 degrees in summer for maximum power generation. The plurality of photovoltaic generation units 130 in the cryptocurrency computing power supply system may use polycrystalline solar array for higher energy density and increased generation capacity of the solar array, according to one embodiment.

The battery management module 604 of the solar mining module 120 may be a software component and/or part of a program to control the switching of power supply from the solar DC power generation system 102 and/or AC power grid 114 for optimally charging the energy storage device 136. The battery management module 604 may allow optimal charging of the energy storage device 136 depending on the least expensive power source depending upon the time of the day and clear to cloudy skies, power supply regulation. The battery management module 604 may include a power storage facility (e.g., energy storage device 136), according to one embodiment.

The electric grid interface 606 may be a system to allow the solar mining module 120 (e.g., mining node power management system) to receive power supply in a plurality of different modes. The electric grid interface 606 may allow the solar mining module 120 to draw from different power supply sources. In case of power failure, the electric grid interface 606 may allow the solar mining module 120 to switch automatically from solar DC power generation system 102 to the AC power grid 114. During the transition of once power supply source to another, the electric grid interface 606 may automatically maintain a stable power supply from the power storage facility (e.g., energy storage device 136) of the solar mining module 120, according to one embodiment.

According to an exemplary embodiment, the power management system for the cryptocurrency mining servers (e.g., plurality of mining servers 108) may include a solar array system (e.g., plurality of photovoltaic generation units 130), a battery management module 604, and an electric grid interface 606. The solar array system may use polycrystalline solar array for higher energy density and the increased generation capacity. The battery management module 604 may include a power storage facility. The battery of the battery management module 604 may be charged by the solar power generated from the solar array (e.g., plurality of photovoltaic generation units 130). The whole power from solar panels (e.g., plurality of photovoltaic generation units 130) during the daytime hours, on-peak hours during the day will be generated for no fuel. The battery system (e.g., energy storage device 136) may support the cryptocurrency mining server farm (e.g., cryptocurrency mining farm 902) during power cuts through the day, according to one embodiment.

The power management system connected to the electric grid interface 606 may be plugged into the local power grid (e.g., AC power grid 114). In case of power failure from solar array (e.g., plurality of photovoltaic generation units 130), the intelligent system (e.g., battery management module 604) of the power management system may pull power and automatically switch from solar power to the electric power grid (e.g., AC power grid 114). The power management system for the cryptocurrency mining servers may have three sources of power. It's like a hybrid system. Sometimes power management system (e.g., solar mining module 120) may be receiving power from the batteries (e.g., energy storage device 136), sometimes it may be receiving power from the generator (e.g., AC generator 116) and sometimes it may be receiving power from the gasoline engine. The power management system (e.g., solar mining module 120) may have three energy storage systems, it may have the solar array (e.g., plurality of photovoltaic generation units 130), the battery system (e.g., energy storage device 136) and the local power grid (e.g., AC power grid 114), all are controlled by the power management system. The power management system (e.g., solar mining module 120) may work like the master brain that keeps tabs on the solar array (e.g., plurality of photovoltaic generation units 130), the battery management module 604 and the electric grid interface. The power management system (e.g., solar mining module 120) may control from where the power is coming from in any given second of the day. The solar array (e.g., plurality of photovoltaic generation units 130) may be managed by single axis tracking and altitude adjustment using tracker with altitude management 602, according to one embodiment.

The solar array system (e.g., plurality of photovoltaic generation units 130) may get dramatically higher generation from the solar cells if the sun is tracked across the sky throughout the day. It may give 9 plus hours of perpendicular solar rays. It will have incidence of all photons on the solar cell for 9-9.5 hours of the day. The altitude adjustment may be done manually. The power management system (e.g., solar mining module 120) may generate a more efficient way to harvest electrical energy using the solar array (e.g., plurality of photovoltaic generation units 130), according to one embodiment.

Figure 7:
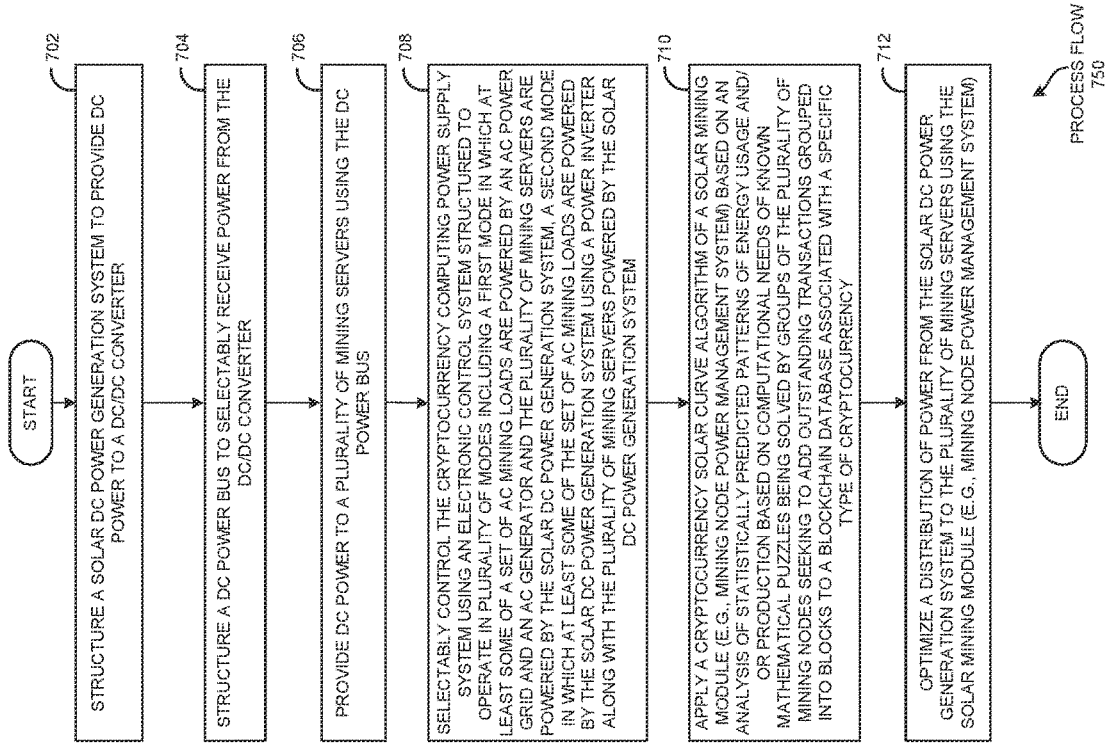
FIG. 7 is a process flow detailing the operations involved in optimizing the power distribution using the cryptocurrency solar curve algorithm of the cryptocurrency energy consumption database of the solar mining module of FIG. 1, according to one embodiment.

FIG. 7 is a process flow 750 detailing the operations involved in optimizing the power distribution using the cryptocurrency solar curve algorithm 124 of the cryptocurrency energy consumption database 122 of the solar mining module 120 of FIG. 1, according to one embodiment.

In operation 702, the cryptocurrency computing power supply system may structure a solar DC power generation system 102 to provide DC power to a DC/DC converter 104. In operation 704, the cryptocurrency computing power supply system may structure a DC power bus 106 to selectably receive power from the DC/DC converter 104. In operation 706, the cryptocurrency computing power supply system may provide DC power to a plurality of mining servers 108 using the DC power bus 106, according to one embodiment.

In operation 708, the cryptocurrency computing power supply system may selectably control the cryptocurrency computing power supply system using an electronic control system 110 structured to operate in plurality of modes including a first mode in which at least some of a set of AC mining loads 112 are powered by an AC power grid 114 and an AC generator 116 and the plurality of mining servers 108 are powered by the solar DC power generation system 102. In a second mode, at least some of the set of AC mining loads 112 are powered by the solar DC power generation system 102 using a power inverter along with the plurality of mining servers 108 powered by the solar DC power generation system 102, according to one embodiment.

In operation 710, the cryptocurrency computing power supply system may apply a cryptocurrency solar curve algorithm 124 of a solar mining module 120 based on an analysis of statistically predicted patterns of energy usage and/or production based on computational needs of known mathematical puzzles being solved by groups of the plurality of mining nodes (e.g., plurality of mining servers 108) seeking to add outstanding transactions grouped into blocks to a blockchain database associated with a specific type of cryptocurrency, according to one embodiment.

In operation 712, the cryptocurrency computing power supply system may optimize a distribution of power from the solar DC power generation system 102 to the plurality of mining servers 108 using the solar mining module 120.

Figure 8:
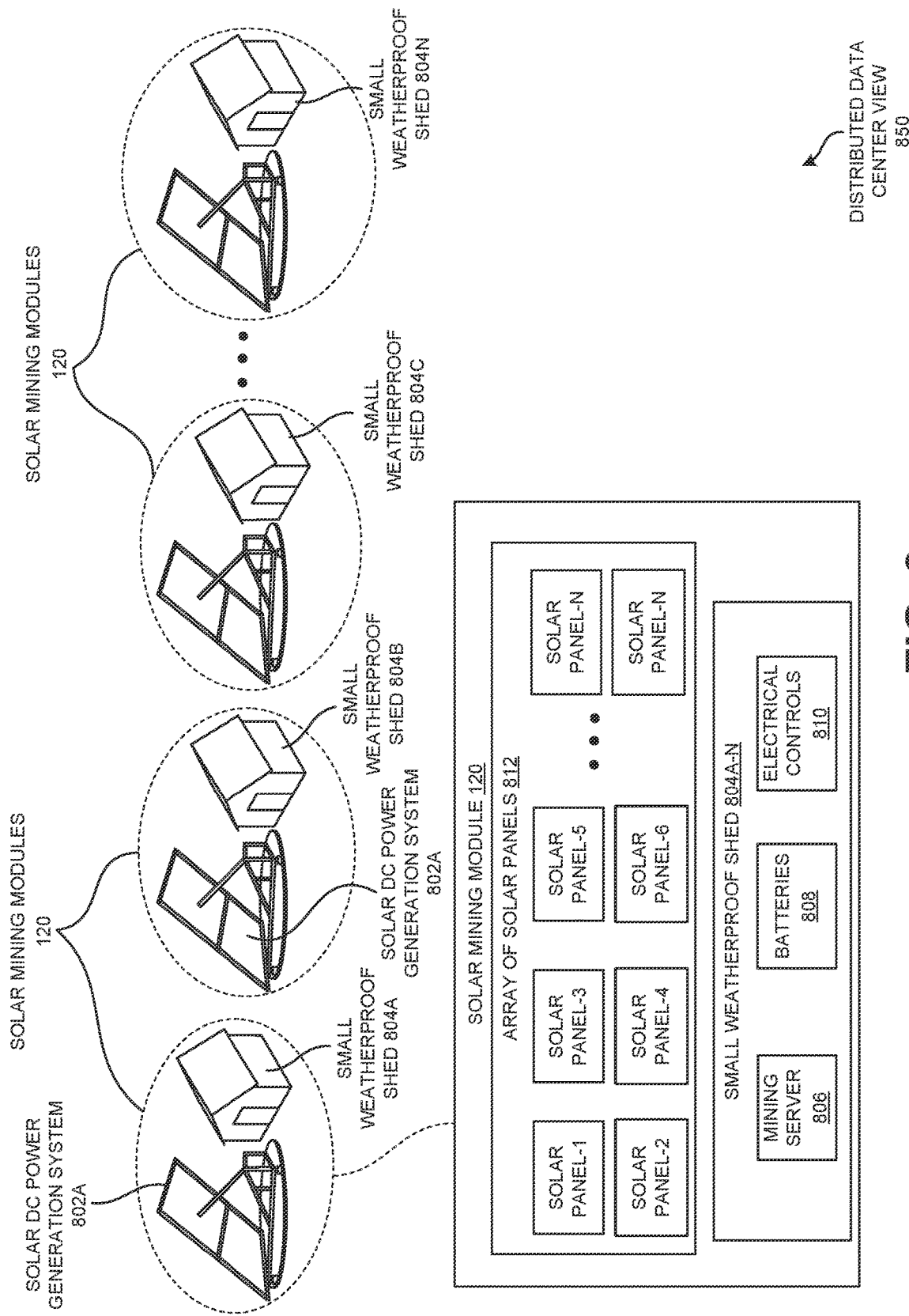
FIG. 8 is a preferred embodiment illustrating a distributed data center view of the cryptocurrency computing power supply system of FIG. 1 deployed in a scattered environment spread across different geographical area.

FIG. 8 is a distributed data center view 850 of the cryptocurrency computing power supply system of FIG. 1 deployed in a scattered environment spread across different geographical area. Particularly, FIG. 8 illustrates an exemplary embodiment of the plurality of cryptocurrency computing power supply system may be deployed to power different set of mining loads 812A-N located in different geographical areas by establishing a solar DC generation system 802A-N in the same geographical area to optimize the power supply resources efficiently. Each of the individual set of mining loads 812A-N distributed across different geographical areas may be powered by the solar DC generation system 802A-N located in the same geographical area, according to one embodiment.

In a preferred embodiment, the solar mining modules 120 may include an array of solar panels 812(1-N) and modular groupings of mining servers 806 housed in a group of small weatherproof sheds 804A-N. In addition, the small weatherproof shed 804A-N may include batteries 808 and electrical controls 810 to manage power distribution across plurality of mining servers 806 of the solar mining modules 120. In another embodiment, the electrical controls 810 may be the electronic control system 110 of the cryptocurrency computing power supply system 150 of FIG. 1 in a distributed environment.

Figure 9:
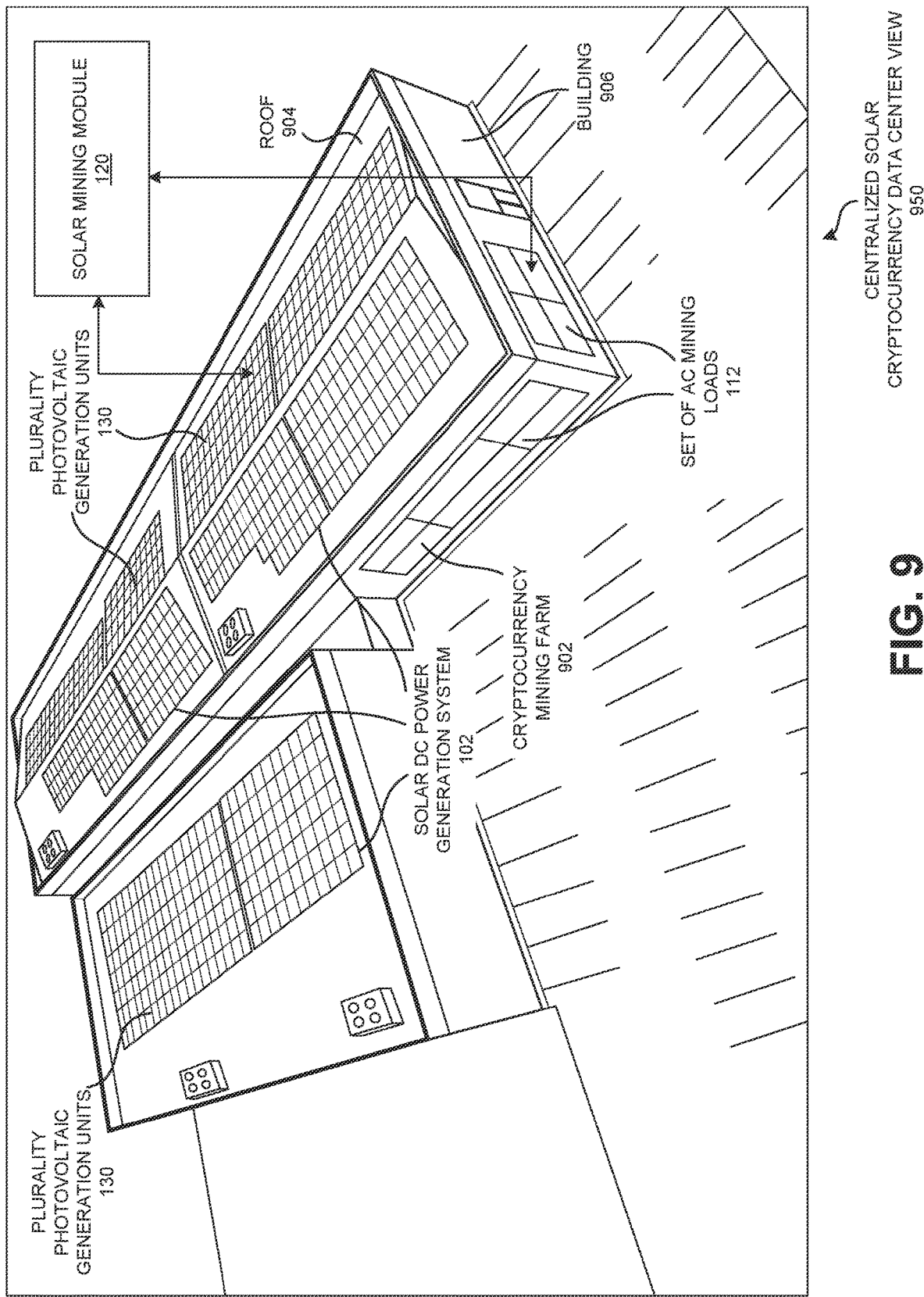
FIG. 9 is an alternative embodiment illustrating a centralized solar cryptocurrency data center view of the cryptocurrency computing power supply system of FIG. 1 deployed in an integrated environment.

FIG. 9 is a centralized solar cryptocurrency data center view 950 of the cryptocurrency computing power supply system of FIG. 1 deployed in an integrated environment. According to one embodiment, the cryptocurrency computing power supply system of FIG. 1 may be deployed to provide an uninterrupted power supply to cryptocurrency mining farm 902 located in a single geographical area. The cryptocurrency mining farm 902 may include thousands of mining nodes located in a single geographical area running continuously for mining the cryptocurrency. The solar DC power generation system 102 may be used to meet the power supply requirements of the to cryptocurrency mining farm 902 by installing plurality of photovoltaic generation units 130 at the roof 904 of the building 906 used for housing the cryptocurrency mining farm 902. The centralized solar cryptocurrency data center may help ensuring continuous power supply to the plurality of mining servers 108 by reducing the transmission loss and efficient power supply management using the cryptocurrency solar curve algorithm 124 of the solar mining module 120 (e.g., mining node power management system) of FIG. 1, according to one embodiment.

An example embodiment will now be described. ACME BitCo Network may be operating a cryptocurrency mining farm running thousands of its mining servers in its facility. The mining farm of ACME BitCo Network may be consuming continuous amounts of energy for running its facility and providing air conditioning and other cooling systems to the farm. The ACME BitCo Network may be facing intermittent power outage situations due to ineffective power supply management from its existing power sources, including utility power grids and solar power systems, causing huge monetary loss.

To overcome its recurring power outage situations, the ACME BitCo Network may have installed the new cryptocurrency computing power supply system as described in various embodiments of FIGS. 1 to 9 for improved power supply management to its cryptocurrency mining far. The new cryptocurrency computing power supply system as described in various embodiments of FIGS. 1 to 9 may have helped the ACME BitCo Network to effectively power its cryptocurrency mining facility by regulating the power generated by multiple power sources (e.g., solar power generation system 102 and AC power grid 114). The new cryptocurrency computing power supply system as described in various embodiments of FIGS. 1 to 9 may have helped in reducing the power consumption from the utility grid and reduced the energy cost of the power distribution system by automatically controlling the power supply in the facility, making it efficient and preventing loss of financial resources. The ACME BitCo Network may now be able to manage its power supply needs based on the predicted energy consumption patterns 128 of its mining nodes in the facility using the electronic control system 110 of the new cryptocurrency computing power supply system.

Solar Mining Modules (SMMs) 120 may be replicated and/or combined to create a Solar Mining Array (SMA) of any size. Each Solar Mining Module 120 may be self-contained and may operate independently. In a preferred embodiment SMMs 120 may be relatively small which solves one of the key problems with solar power generation: much of the electrical energy may lost over transmitting power across a solar array to the power grid, to converting it from DC to AC, and from transforming voltage. By avoiding most of these elements, embodiments described herein may capturing a much higher % of the raw electrical power that each solar cell actually produces (this might be more than 30% savings of power that is typically lost).

Illustrative SMM Design may be 55 kW of cryptocurrency mining servers 806 and 54 kW of solar panels (180 panels at 0.3 kW per panel). Example solar panel 812 may have Approx Dimensions: 2 m×1 m, and 300 Watts. Example of mount/tracking system in a preferred embodiment may holds 30 panels (so 6 tracking systems usable). Approx Dimensions may be: 12 m long×5 m wide×4 m tall. Example of mining server 806 in a preferred embodiment may be a Bitmain Antminer S9 having Approx Dimensions (with PSU): 30 cm×20 cm×46 cm. In a preferred embodiment, a battery module may have approx Dimensions may be: 0.8 m×1.75 m. Overall SMM Dimensions may be: Length: 40 m, Width: 12 m, Height: 4 m.

It should be noted that the electronic control system 110 and the solar mining module 120 (an example mining node power management system) discussed above may be implemented through electrical/electronic circuits, software/firmware instructions executing on data processing devices and/or a combination thereof. Further, it should be noted that the solar mining module 120 may apply cryptocurrency solar algorithm 124 through execution thereof on one or more processor(s) associated therewith.

Figure 10:
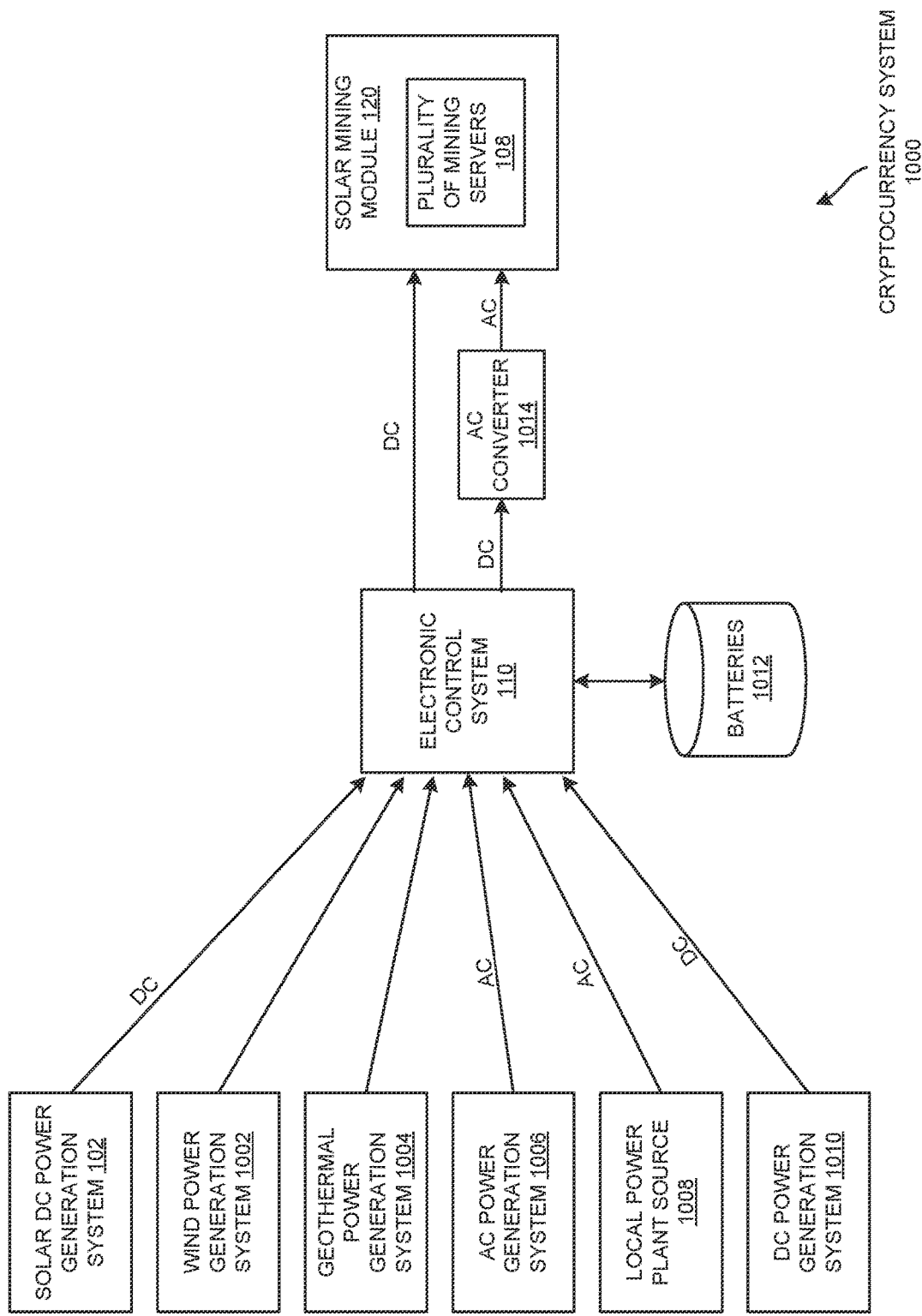
FIG. 10 is a generalized schematic view of a cryptocurrency system in accordance with the embodiments of FIGS. 1-9 including one or more renewable energy source based power systems, according to one or more embodiments.

Exemplary embodiments discussed above with reference to FIGS. 1-9 have been based on solar power optimization to the plurality of mining servers 108. However, it is easy to see, even at the time of filing U.S. patent application Ser. No. 16/115,623, that concepts discussed above are extensible to any renewable energy source based power system of which the solar DC power generation system 102 is a mere example. Other examples of a renewable energy source based power system may be based on, but not limited to, hydroelectric power, geothermal power, wind power, biomass power, tidal power and hydrogen based power. FIG. 10 shows a generalized cryptocurrency system 1000 in accordance with the embodiments of FIGS. 1-9, with multiple power supplies, according to one or more embodiments. While a couple of renewable energy source based power systems such as solar DC power generation system 102, a wind power generation system 1002 and a geothermal power generation system 1004 are shown in FIG. 10, it is obvious that other renewable energy source based power systems are within the scope of the exemplary embodiments discussed herein. In one or more embodiments, instead of switches and buses, AC power system components of FIGS. 1-9 have been abstracted as AC power generation system 1006. It should be noted that renewable energy source based power systems in general may generate DC power and/or AC power.

Further, it should be noted that a local power plant source 1008 may be a "behind-the-meter" AC power source that could be subsumed under AC power generation system 1006 including AC grid power and AC generator power; FIG. 10, however, shows local power plant source 1008 as distinct from AC power generation system 1006 for the sake of illustrative clarity. FIG. 10 also shows a DC power generation system 1010 as a power source; solar DC power generation system 102 may be subsumed under DC power generation system 1010; however, as in FIG. 10, DC power generation system 1010 may also be separate and distinct from solar DC power generation system 102, which may be an example renewable energy source based power system.

In one or more embodiments, the batteries/energy storage components discussed above have been subsumed in FIG. 10 under batteries 1012. All of these components/systems may be associated with and/or coupled to electronic control system 110 that, in turn, is associated (e.g., coupled) with solar mining module 120 (e.g., a mining node power management system) including the plurality of mining servers 108. It is also possible to envision a control system including both electronic control system 100 and solar mining module 120 within.

In one or more embodiments, DC power from electronic control system 110 may directly be supplied to the plurality of mining servers 108 and/or be converted into AC by an AC converter 1014 prior to being supplied to the plurality of mining servers 108. For example, a mining server 108 may include an internal Power Supply Unit (PSU; not shown) that converts AC to DC, which means that the purpose of AC converter 1014 in an input path of said mining server 108 is justified. All reasonable variations are within the scope of the exemplary embodiments discussed herein. It should be noted that each mining server 108 of the plurality of mining server(s) 108, in some embodiments, may have a separate AC converter (e.g., AC converter 1014) in an input path thereof.

Thus, analogous to the selectable control of a power supply from an AC system and/or a solar DC power generation system 102 to the plurality of mining servers 108/AC mining loads 112 using electronic control system 110, it is obvious that electronic control system 110 may selectably control power supply from a renewable energy source based power system (see examples in FIG. 10) and an AC power system and/or a DC power system to a cryptocurrency system (e.g., cryptocurrency system 1000) including the plurality of mining servers 108 and the AC mining loads 112. All power optimizations (e.g., using electronic control system 110 and/or using solar mining module 120) relevant to supplying solar power to the plurality of mining servers 108 are also applicable to supplying renewable energy source based power to the plurality of mining servers 108.

FIGS. 1-10 and the discussion associated therewith may apply to power (e.g., solar, renewable energy source based) distribution and/or optimization to a cryptocurrency system (e.g., cryptocurrency computing power supply system 150, cryptocurrency system 1000) including the plurality of mining servers 108 and/or the set of AC mining loads 112. However, cryptocurrency mining may merely be an example of high computational workloads executed on the plurality of mining servers 108. Even at the time of filing parent U.S. patent application Ser. No. 16/115,623, it was well known that cryptocurrency mining involved high computational workloads. Thus, concepts discussed with respect to power distribution and/or optimization of power to a cryptocurrency system in FIGS. 1-10 are extensible to any high computational workload environment.

In one or more embodiments, a high computational workload may be defined as a computational workload requiring at least 50% utilization of a maximum rated power consumption of one or more data processing device(s) therethrough per day, less than 50% idle time of the one or more data processing device(s) per day and at least 1 kilowatt hour (KWh) of power consumption through the one or more data processing device(s) per day. In other words, the high computational workload may require high availability of computing resources (e.g., the aforementioned one or more data processing device(s), the plurality of mining servers 108) for execution thereof.

Figure 11:
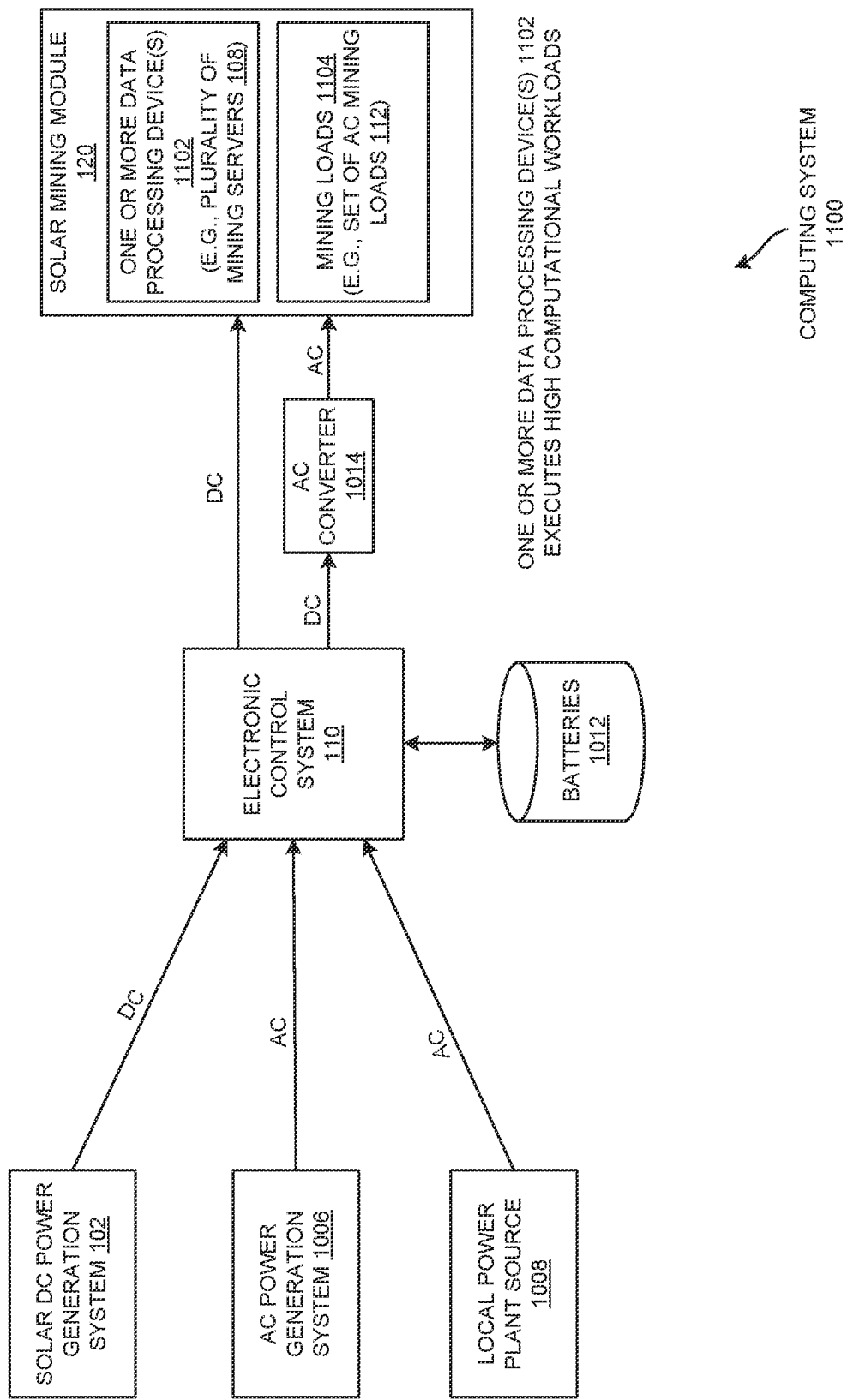
FIG. 11 is a generalized schematic view of a computing system in accordance with the embodiments of FIGS. 1-10 in which solar power supplied to one or more elements thereof executing high computational workloads is optimized, according to one or more embodiments.

Examples of the above one or more data processing device(s) (e.g., one or more data processing device(s) 1102 of FIG. 11 below) in the context of FIGS. 1-10 may be the plurality of mining servers 108. The one or more data processing device(s) may be a single high performance computing device (e.g., a supercomputer), a conglomeration of computing devices, a networked set of computing devices (e.g., servers), a distributed set of computing devices or a combination thereof. FIG. 11 shows a computing system 1100 in which solar power (or even renewable energy source based power) supplied to one or more data processing device(s) 1102 may be optimized, according to one or more embodiments. In one or more embodiments, FIG. 11 may inherit all elements of FIGS. 1-10 and the concepts associated with FIG. 11 may inherit all concepts discussed with respect to FIGS. 1-10. FIG. 11 shows electronic control system 110 selectably controlling power supply from solar DC power generation system 102 and an AC system (e.g., AC power generation system 1006 and/or local power plant source 1008; all discussions with regard to FIG. 10 may also be applicable to FIG. 11) to the one or more data processing device(s) 1102.

FIG. 11 also shows mining loads 1104 (e.g., set of AC mining loads 112) as part of solar mining module 120 (e.g., mining node power management system, or, computing power management system in general), according to one or more embodiments. It is obvious that the same discussion regarding electronic control system 110 and solar mining module 120 being part of the same control system in another embodiment is applicable here too. FIG. 11 shows the example embodiment of electronic control system 110 and solar mining module 120 being distinct from one another merely for example purposes.

In one or more embodiments, the one or more data processing device(s) 1102 may execute the high computational workloads discussed above. Although a high computational workload may more generally be defined as requiring at least 50% utilization of a maximum rated power consumption of the one or more data processing device(s) 1102 therethrough per day and less than 50% idle time of the one or more data processing device(s) 1102 per day, at least 75% utilization of the maximum rated power consumption of the one or more data processing device(s) 1102 per day and less than 25% idle time of the one or more data processing device(s) 1102 per day may be typical. In one or more embodiments, another requirement of the high computational workload may be a minimum of a 63% average uptime of the one or more data processing device(s) 1102 in a year. "Uptime," as discussed herein, may refer to a time during which the one or more data processing device(s) 1102 is in operation; a 63% average uptime per year may thus refer to the one or more data processing device(s) 1102 being in operation for an average of 63% of the time in a year. Other typical values of the average uptime requirement of the high computational workload may be a minimum of 66%, 70%, 75%, 80%, 85% and 90% of the time in a year. In one or more embodiments, computing system 1100 discussed herein may be capable of serving such high requirements of average uptimes for the high computational workload.

Other than cryptocurrency mining, in one or more embodiments, other examples of the high computational workload may include but are not limited to processing associated with a gaming environment (e.g., an online gaming environment, gaming application, metaverse applications, video games, gaming processes such as rendering visual content displayed to users, securing virtual asset ownership for participants and/or players, facilitating secure transfers of virtual assets between users of online games and/or environments, securing operation(s) of blockchain-based databases used to support functionality of applications and operations involved in massively multiplayer online gaming environments), processing (e.g., large dataset manipulation, storage, interpretation and/or reporting) associated with a dataset, processing associated with a Machine Learning (ML) environment (e.g., executing ML algorithms, training datasets in an ML system), processing associated with Artificial Intelligence (AI) such as support and/or operation of AI and/or neural computing networks, processing associated with pattern recognition in the dataset (e.g., video content, image content, audio content, text content), processing associated with multimedia content (e.g., video, audio and/or text, movies, television, visual effects rendering and/or production), processing associated with a cryptocurrency system associated with computing system 1100 such as operation support and/or security of proof-of-stake cryptocurrencies and/or blockchain-based networks and systems, and processing relevant to load balancing associated with computing system 1100 such as load balancing within computing system 1100 (e.g., a datacenter) and load balancing of external elements (e.g., datacenter elements) through computing system 1100.

In one or more embodiments, in the case of a solar based setup, the high computational workload may involve, but is not limited to, heterogeneous computational workloads in solar-powered datacenters and running/blending/balancing multiple workloads in the solar-powered datacenters. All power optimizations with respect to power supply, energy management and/or energy production relevant to the one or more data processing device(s) 1102 (e.g., the plurality of mining servers 108) and/or mining loads 1104 (e.g., set of AC mining loads 112) are within the scope of the exemplary embodiments discussed herein. It is to be noted that, as discussed above, a power supply requirement (e.g., power consumption requirement through the one or more data processing device(s) 1102/the plurality of mining servers 108) of executing a high computational workload through the one or more data processing device(s) 1102 may be continuously updated through solar mining module 120 based on power production through solar DC power generation system 102 and/or batteries 1012 (e.g., energy storage device 136) in accordance with analyzing predicted (e.g., statistically) energy usage and/or predicted (e.g., statistically) energy production relevant to the execution of the computational workload through the one or more data processing device(s) 1102.

Because prediction of energy usage/production requires prior energy usage and/or prior energy production data from computing system 1100 (e.g., data from the one or more data processing device(s) 1102, the solar DC power generation system 102, the batteries 1012/energy storage device 136 and/or a set of loads/mining loads 1104 associated with the one or more data processing device(s) 1102), exemplary embodiments may also involve continuously updating (e.g., through solar mining module 120) the power supply requirement of the execution of the high computational workload through the one or more data processing device(s) 1102 in accordance with analyzing prior energy usage and/or prior energy production relevant to the execution of the high computational workload through the one or more data processing device(s) 1102. In one or more embodiments, power supply/consumption requirement may thus be adjusted based on power production through computing system 1100, as discussed above. All reasonable variations are also within the scope of the exemplary embodiments discussed herein.

As discussed above, battery management module 604 of the solar mining module 120 may be a software component and/or part of a program to control the switching of power supply from the solar DC power generation system 102 and/or AC power grid 114 for optimally charging the energy storage device 136. Again, as discussed above, battery management module 604 itself may monitor a parameter of operation of energy storage device 136/batteries 1012 to enable solar mining module 120 update (e.g., continuously) said parameter of operation of energy storage device 136/batteries 1012. In one or more embodiments, based on the continuously updated parameter of operation of energy storage device 136/batteries 1012, power supply from energy storage device 136/batteries 1012 to the one or more data processing device(s) 1102 (e.g., the plurality of mining servers 108) discussed above may be optimized, as will be discussed below.

Figure 12:
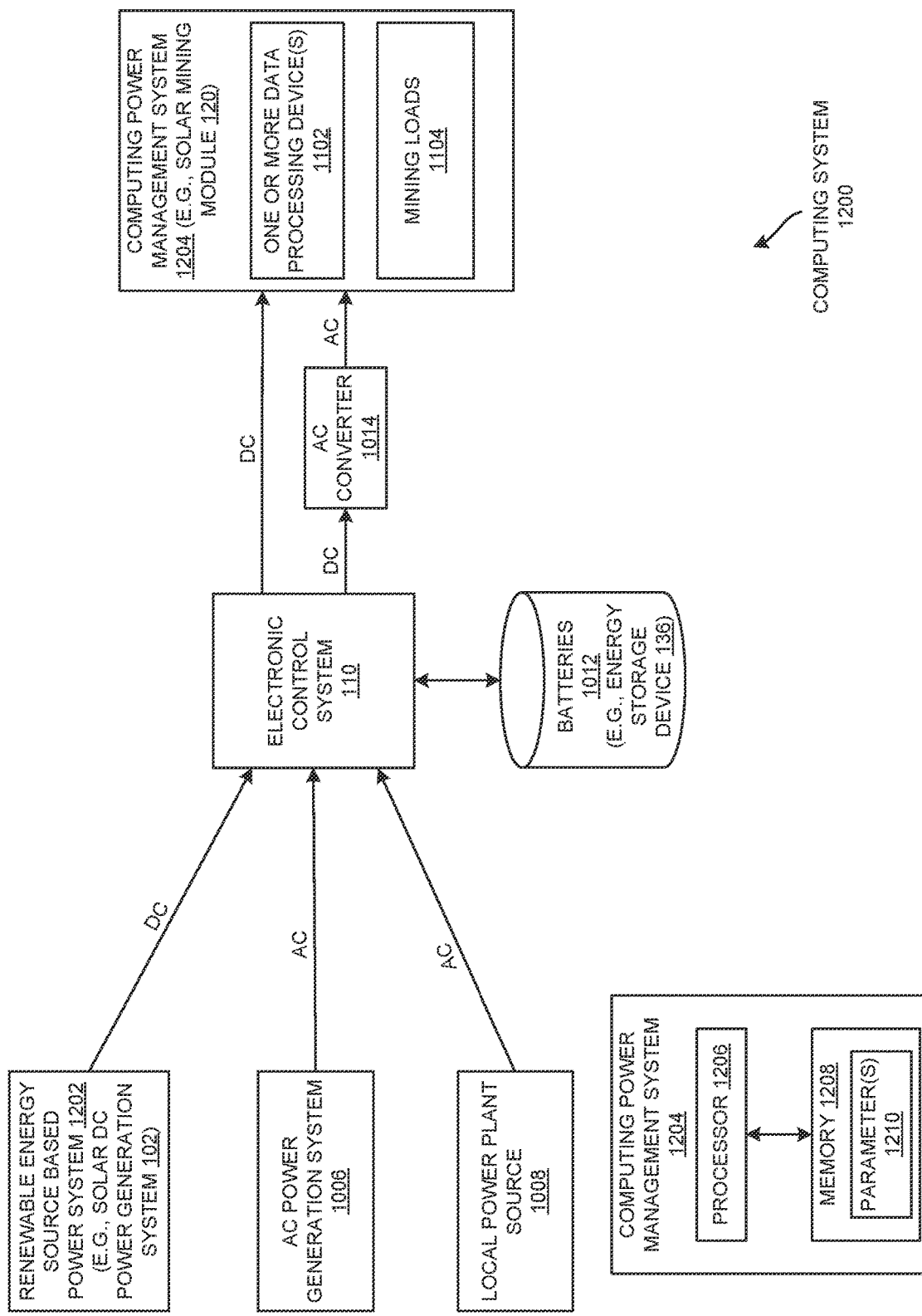
FIG. 12 is a generalized schematic view of a computing system in accordance with the embodiments of FIGS. 1-11 in which power supply from an energy storage device/batteries to one or more data processing device(s) thereof executing high computational workloads is optimized, according to one or more embodiments.

FIG. 12 shows a computing system 1200 compatible with the embodiments of FIG. 1-11 including a renewable energy source based power system 1202 (e.g., solar DC power generation system 102, a wind power generation system 1002 and a geothermal power generation system 1004; solar DC power generation system 102 is solely shown as an example of renewable energy source based system 1202 in FIG. 12 merely for the sake of example purposes) and batteries 1012/energy storage device 136 charged thereby, according to one or more embodiments. In one or more embodiments, a parameter (e.g., parameters 1210 shown stored in a memory 1208 of a computing power management system 1204 communicatively coupled to a processor 1206 thereof) of operation of batteries 1012/energy storage device 136 may be monitored and continuously updated by computing power management system 1204 (e.g., solar mining module 120 associated with electronic control system 110) based on analyzing data pertinent to prior energy usage, prior energy production, predicted energy usage and/or predicted energy production relevant to execution of the high computational workload/workload(s) through the one or more data processing device(s) 1102 discussed above.

In one or more embodiments, the analysis discussed above may be based on the data received from: the one or more data processing device(s) 1102, mining loads 1104 (any set of loads in general), batteries 1012/energy storage device 136 and/or renewable energy source based power system 1202. In one or more embodiments, computing power management system 1204 may monitor a temperature of operation of energy storage device 136/batteries 1012. In one or more embodiments, in accordance with the monitoring of the operating temperature, computing power management system 1204 may update (e.g., continuously) one or more parameter(s) 1210 of operation of energy storage device 136/batteries 1012. In certain other embodiments, even the temperature of operation of energy storage device 136/batteries 1012 may be a parameter (e.g., parameter 1210) of operation of energy storage device 136/batteries 1012. In one or more embodiments, examples of parameters 1210 updated/monitored may include but are not limited to a rate of discharge, a rate of charge, a depth of discharge, a status of charge and/or a temperature of operation of energy storage device 136/batteries 1012.

In one or more embodiments, based on the continuously updated parameter(s) 1210 of operation of energy storage device 136/batteries 1012, power supply from energy storage device 136 to the one or more data processing device(s) 1102 executing the high computational workload(s) may be optimized. It should be noted that all concepts embedded in and discussed with regard to FIGS. 1-11 may be applicable to FIG. 12 and the discussion associated therewith. All reasonable variations are within the scope of the exemplary embodiments discussed herein.

Figure 13:
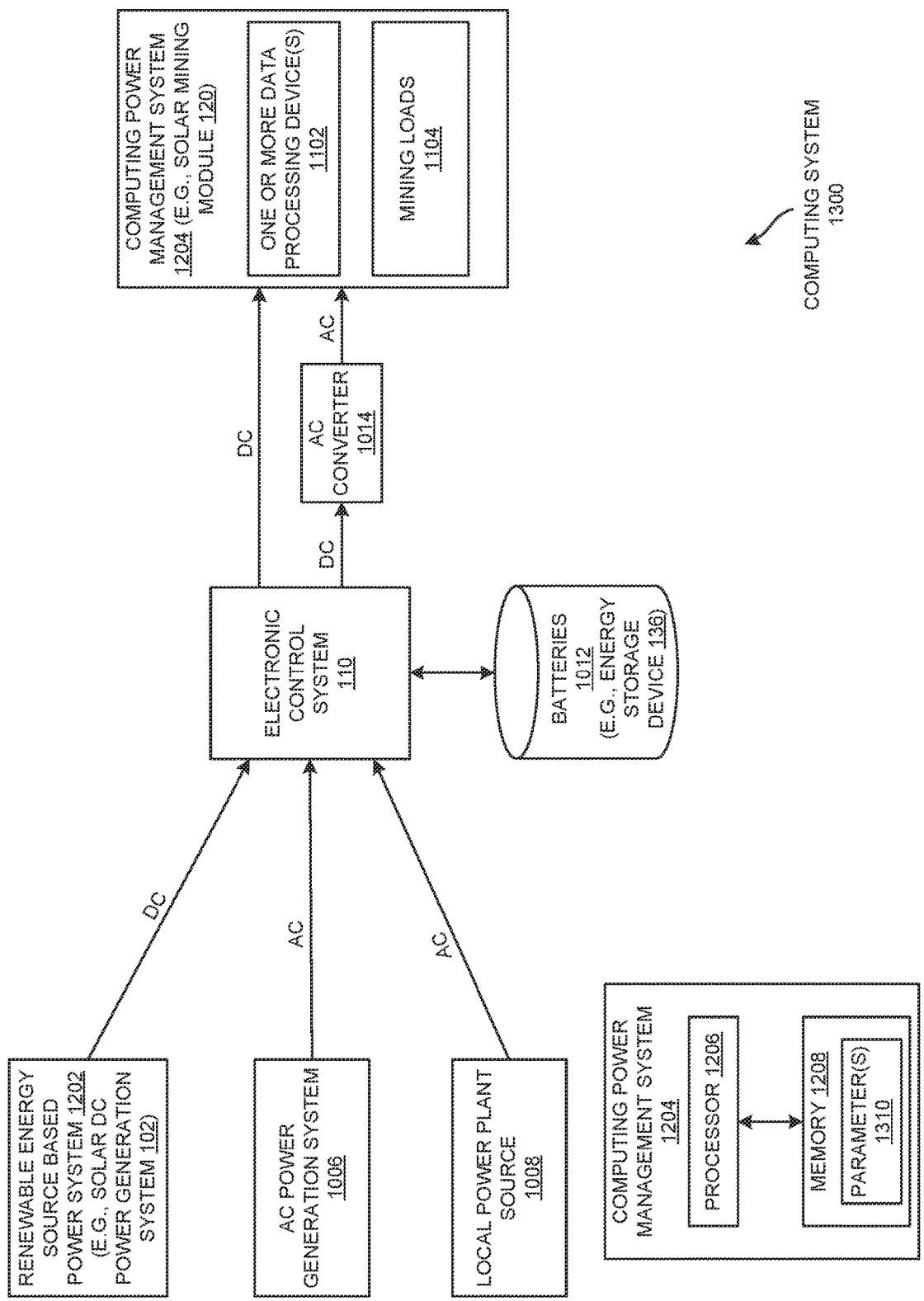
FIG. 13 is a generalized schematic view of another computing system in accordance with the embodiments of FIGS. 1-12 in which power supply from the renewable energy source based power system and/or an energy storage device/batteries thereof to one or more data processing device(s) thereof executing high computational workloads is optimized, according to one or more embodiments.

Once again, as discussed above, the set of AC mining loads 112 (example mining loads 1104, or, in general, any set of loads) may include the electrical power consumed for running the plurality of mining servers 108 (example one or more data processing device(s) 1102) and providing air conditioning and other cooling systems (e.g., immersion cooling systems) of the cryptocurrency farm (e.g., embodying the computing systems discussed above), according to one or more embodiments. FIG. 13 shows yet another computing system 1300 analogous to computing system 1100/1200 and all the systems embodied in FIGS. 1-10 in which computing power management system 1204 monitors and/or updates one or more parameter(s) (e.g., parameters 1310) of operation of the one or more data processing device(s) 1102 and/or mining loads 1104 (or, any set of loads in general).

For example, the one or more data processing device(s) 1102 may heat up during the course of execution of the high computational workload(s) discussed above; a temperature sensor in conjunction with computing power management system 1204 may monitor parameter(s) 1310 and continuously update parameter(s) 1310 to mitigate the effects of the heating by optimizing the power supply from renewable energy source based power system 1202 and/or energy storage device 136 to the one or more data processing device(s) 1102 in accordance with the continuous updates to parameter(s) 1310. In another example, parameter(s) 1310 of an immersion cooling system (example mining loads 1104) in which the one or more data processing device(s) 1102 may be immersed may be monitored through computing power management system 1204 and continuously updated (e.g., in accordance with the monitoring of parameters 1310) to optimize the power supply from renewable energy source based power system 1202 and/or energy storage device 136 to the one or more data processing device(s) 1102. In this case, example parameter(s) 1310 monitored/updated may include but are not limited to a pump speed of the immersion cooling system and a fan speed thereof. It should be noted that all concepts relevant to FIGS. 1-12 and the discussion associated therewith are applicable to FIG. 13 and the discussion associated therewith. Yet again, in one or more embodiments, parameter(s) 1310 may be monitored and continuously updated based on analyzing data pertinent to prior energy usage, prior energy production, predicted energy usage and/or predicted energy production relevant to execution of the high computational workload/workload(s) through the one or more data processing device(s) 1102 discussed above. All reasonable variations are within the scope of the exemplary embodiments discussed herein.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., data processing device 100). Accordingly, the specification and drawings are to be regarded in an illustrative rather than a restrictive sense.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method comprising:
   selectably controlling a power supply from a renewable energy source based power system and at least one of: an energy storage device charged by the renewable energy source based power system and an Alternating Current (AC) power system to a computing system comprising at least one data processing device and a set of loads associated therewith using an electronic control system;
   continuously updating, through a computing power management system associated with the electronic control system, a parameter of operation of at least one of: the at least one data processing device and the set of loads of the computing system in response to analyzing, through the computing power management system, data pertinent to at least one of: prior energy usage, prior energy production, predicted energy usage and predicted energy production relevant to execution of a high computational workload through the at least one data processing device, the data being received from at least one of: the at least one data processing device, the renewable energy source based power system, the energy storage device and the set of loads, and the high computational workload requiring at least 50% utilization of a maximum rated power consumption of the at least one data processing device therethrough per day, less than 50% idle time of the at least one data processing device per day, and at least 1 kilowatt hour (KWh) of power consumption through the at least one data processing device per day; and
   optimizing the power supply from at least one of: the renewable energy source based power system and the energy storage device to the at least one data processing device using the computing power management system based on the continuously updated parameter of operation of the at least one of: the at least one data processing device and the set of loads.

2. The method of claim 1, further comprising:
   continuously updating, through the computing power management system, another parameter of operation of the energy storage device in response to analyzing, through the computing power management system, the data pertinent to the at least one of: the prior energy usage, the prior energy production, the predicted energy usage and the predicted energy production relevant to the execution of the high computational workload through the at least one data processing device; and
   optimizing the power supply from the energy storage device to the at least one data processing device using the computing power management system based on the continuously updated another parameter of operation of the energy storage device.

3. The method of claim 1, further comprising:
   continuously updating, through the computing power management system, a power consumption requirement of the execution of the high computational workload through the at least one data processing device based on power production through the at least one of: the renewable energy source based power system and the energy storage device in accordance with analyzing the data pertinent to the at least one of: the prior energy usage, the prior energy production, the predicted energy usage and the predicted energy production; and
   optimizing the power supply from the renewable energy source based power system to the at least one data processing device based on the continuously updated power consumption requirement of the execution of the high computational workload.

4. The method of claim 3, comprising:
   the renewable energy source based power system being a solar Direct Current (DC) power system comprising a plurality of photovoltaic generation units, each of which comprises a tracker;
   adjusting, through the tracker, orientation of components of the each photovoltaic generation unit such that solar energy captured thereby is maximized; and
   optimizing the power supply from the solar DC power system to the at least one data processing device based on the continuously updated power consumption requirement of the execution of the high computational workload in accordance with monitoring the each photovoltaic generation unit comprising the tracker.

5. The method of claim 1, comprising the renewable energy source based power system being based on at least one of: hydroelectric power, geothermal power, wind power, biomass power, tidal power, solar power and hydrogen based power.

6. The method of claim 1, comprising the high computational workload being at least one of: processing associated with a gaming environment, processing associated with a dataset, processing associated with a Machine Learning (ML) environment, processing associated with Artificial Intelligence (AI), processing associated with pattern recognition in the dataset, processing associated with multimedia content, processing associated with a cryptocurrency system associated with the computing system, and processing relevant to load balancing associated with the computing system.

7. The method of claim 1, comprising the energy storage device comprising at least one of: a battery, a supercapacitor and a flywheel.

8. The method of claim 1, further comprising at least one of:
monitoring, through the computing power management system, the parameter of operation of the at least one of: the at least one data processing device and the set of loads; and
updating, through the computing power management system, the parameter of operation of the at least one of: the at least one data processing device and the set of loads based on the monitored parameter of operation thereof.

9. A computing power supply system comprising:
a renewable energy source based power system;
an electronic control system to selectably control a power supply from the renewable energy source based power system and at least one of: an energy storage device charged by the renewable energy source based power system and an Alternating Current (AC) system to a computing system comprising at least one data processing device and a set of loads associated therewith; and
a computing power management system associated with the electronic control system to continuously update a parameter of operation of at least one of: the at least one data processing device and the set of loads of the computing system in response to analyzing, through the computing power management system, data pertinent to at least one of: prior energy usage, prior energy production, predicted energy usage and predicted energy production relevant to execution of a high computational workload through the at least one data processing device, the data being received from at least one of: the at least one data processing device, the renewable energy source based power system, the energy storage device and the set of loads, and the high computational workload requiring at least 50% utilization of a maximum rated power consumption of the at least one data processing device therethrough per day, less than 50% idle time of the at least one data processing device per day, and at least 1 kilowatt hour (KWh) of power consumption through the at least one data processing device per day,
wherein the computing power management system optimizes the power supply from at least one of: the renewable energy source based power system and the energy storage device to the at least one data processing device based on the continuously updated parameter of operation of the at least one of: the at least one data processing device and the set of loads.

10. The computing power supply system of claim 9, wherein:
the computing power management system continuously updates another parameter of operation of the energy storage device in response to analyzing, through the computing power management system, the data pertinent to the at least one of: the prior energy usage, the prior energy production, the predicted energy usage and the predicted energy production relevant to the execution of the high computational workload through the at least one data processing device, and
the computing power management system optimizes the power supply from the energy storage device to the at least one data processing device based on the continuously updated another parameter of operation of the energy storage device.

11. The computing power supply system of claim 9, wherein:

the computing power management system continuously updates a power consumption requirement of the execution of the high computational workload through the at least one data processing device based on power production through the at least one of: the renewable energy source based power system and the energy storage device in accordance with analyzing the data pertinent to the at least one of: the prior energy usage, the prior energy production, the predicted energy usage and the predicted energy production, and
the computing power management system optimizes the power supply from the renewable energy source based power system to the at least one data processing device based on the continuously updated power consumption requirement of the execution of the high computational workload.

12. The computing power supply system of claim 11, wherein:
the renewable energy source based power system is a solar Direct Current (DC) power system comprising a plurality of photovoltaic generation units, each of which comprises a tracker,
the tracker adjusts orientation of components of the each photovoltaic generation unit such that solar energy captured thereby is maximized, and
the computing power management system optimizes the power supply from the solar DC power system to the at least one data processing device based on the continuously updated power consumption requirement of the execution of the high computational workload in accordance with monitoring the each photovoltaic generation unit comprising the tracker.

13. The computing power supply system of claim 9, wherein the renewable energy source based power system is based on at least one of: hydroelectric power, geothermal power, wind power, biomass power, tidal power, solar power and hydrogen based power.

14. The computing power supply system of claim 9, wherein the high computational workload is at least one of: processing associated with a gaming environment, processing associated with a dataset, processing associated with a Machine Learning (ML) environment, processing associated with Artificial Intelligence (AI), processing associated with pattern recognition in the dataset, processing associated with multimedia content, processing associated with a cryptocurrency system associated with the computing system, and processing relevant to load balancing associated with the computing system.

15. The computing power supply system of claim 9, wherein the energy storage device comprises at least one of: a battery, a supercapacitor and a flywheel.

16. The computing power supply system of claim 9, wherein:
the computing power management system monitors the parameter of operation of the at least one of: the at least one data processing device and the set of loads, and
the computing power management system updates the parameter of operation of the at least one of: the at least one data processing device and the set of loads based on the monitored parameter of operation thereof.

17. A computing system comprising:
at least one data processing device;
a set of loads associated with the at least one data processing device;
a renewable energy source based power system;
an electronic control system to selectably control a power supply from the renewable energy source based power system and at least one of: an energy storage device charged by the renewable energy source based power system and an Alternating Current (AC) system to the at least one data processing device; and a computing power management system associated with the electronic control system to continuously update a parameter of operation of at least one of: the at least one data processing device and the set of loads in response to analyzing, through the computing power management system, data pertinent to at least one of: prior energy usage, prior energy production, predicted energy usage and predicted energy production relevant to execution of a high computational workload through the at least one data processing device, the data being received from at least one of: the at least one data processing device, the renewable energy source based power system, the energy storage device and the set of loads, and the high computational workload requiring at least 50% utilization of a maximum rated power consumption of the at least one data processing device therethrough per day, less than 50% idle time of the at least one data processing device per day, and at least 1 kilowatt hour (KWh) of power consumption through the at least one data processing device per day, wherein the computing power management system optimizes the power supply from at least one of: the renewable energy source based power system and the energy storage device to the at least one data processing device based on the continuously updated parameter of operation of the at least one of: the at least one data processing device and the set of loads.

18. The computing system of claim 17, wherein:

the computing power management system continuously updates another parameter of operation of the energy storage device in response to analyzing, through the computing power management system, the data pertinent to the at least one of: the prior energy usage, the prior energy production, the predicted energy usage and the predicted energy production relevant to the execution of the high computational workload through the at least one data processing device, and the computing power management system optimizes the power supply from the energy storage device to the at least one data processing device based on the continuously updated another parameter of operation of the energy storage device.

19. The computing system of claim 17, wherein:

the computing power management system continuously updates a power consumption requirement of the execution of the high computational workload through the at least one data processing device based on power production through the at least one of: the renewable energy source based power system and the energy storage device in accordance with analyzing the data pertinent to the at least one of: the prior energy usage, the prior energy production, the predicted energy usage and the predicted energy production, and the computing power management system optimizes the power supply from the renewable energy source based power system to the at least one data processing device based on the continuously updated power consumption requirement of the execution of the high computational workload.

20. The computing system of claim 17, wherein at least one of:

the high computational workload is at least one of: processing associated with a gaming environment, processing associated with a dataset, processing associated with a Machine Learning (ML) environment, processing associated with Artificial Intelligence (AI), processing associated with pattern recognition in the dataset, processing associated with multimedia content, processing associated with a cryptocurrency system associated with the computing system, and processing relevant to load balancing associated with the computing system, and the renewable energy source based power system is based on at least one of: hydroelectric power, geothermal power, wind power, biomass power, tidal power, solar power and hydrogen based power.

\* \* \* \* \*